United States Patent
Jacobs, II

(10) Patent No.: US 10,866,576 B2
(45) Date of Patent: Dec. 15, 2020

(54) METHODS OF MANUFACTURING ONE OR MORE DISCRETE OBJECTS FROM A BODY OF MATERIAL CREATED BY ADDITIVE MANUFACTURING

(71) Applicant: Proto Labs INC, Maple Plain, MN (US)

(72) Inventor: James L. Jacobs, II, New London, NH (US)

( * ) Notice: Subject to any disclaimer, the term of this patent is extended or adjusted under 35 U.S.C. 154(b) by 275 days.

(21) Appl. No.: 15/981,607

(22) Filed: May 16, 2018

(65) Prior Publication Data

US 2018/0335766 A1    Nov. 22, 2018

Related U.S. Application Data

(60) Provisional application No. 62/506,817, filed on May 16, 2017, provisional application No. 62/530,419, filed on Jul. 10, 2017.

(51) Int. Cl.
  *G05B 19/4099* (2006.01)
  *B33Y 40/00* (2020.01)
  (Continued)

(52) U.S. Cl.
  CPC ......... *G05B 19/4099* (2013.01); *B33Y 40/00* (2014.12); *B33Y 50/02* (2014.12);
  (Continued)

(58) Field of Classification Search
  CPC ............ B29C 44/0469; B29C 44/3461; B29C 44/445; B29C 65/70; C09K 3/10;
  (Continued)

(56) References Cited

U.S. PATENT DOCUMENTS 9,566,138 B2   2/2017  Fisker
10,556,309 B1*  2/2020  Jacobs, II .......... G05B 19/4099
(Continued)

FOREIGN PATENT DOCUMENTS

DE    102015116925    4/2017
WO    2017051029      3/2017

OTHER PUBLICATIONS

Peter Zelinski, Hybrid Machine Combines Milling and Additive Manufacturing, blog post, Nov. 8, 2013 retrieved at http://www.additivemanufacturing.media/blog/post/hybrid-machine-combines-milling-and-additive-manufacturing on May 4, 2017.

*Primary Examiner* — Michael J Brown
(74) *Attorney, Agent, or Firm* — Caldwell Intellectual Property Law

(57) ABSTRACT

A system for manufacturing a plurality of discrete objects from a body of material created by additive manufacturing using an automated manufacturing device includes an automated manufacturing device, the automated manufacturing device including at least a controller configured to receive at least a graphical model of a plurality of structures, receive at least a graphical representation of at least an interconnecting portion, the at least an interconnecting portion connecting at least a first structure of the plurality of structures to at least a second structure of the plurality of structures, and generate a graphical representation of an additively manufacture body of material, as a function of the graphical model of the plurality of structures, and the graphical representation of the at least an interconnecting portion.

18 Claims, 22 Drawing Sheets

(51) Int. Cl.
*B33Y 50/02* (2015.01)
*B29C 44/04* (2006.01)
*B29C 44/34* (2006.01)
*B29C 44/44* (2006.01)
*C09K 3/10* (2006.01)
*G05B 19/40* (2006.01)
*B23C 3/10* (2006.01)

(52) U.S. Cl.
CPC .............. *G05B 2219/35134* (2013.01); *G05B 2219/49007* (2013.01)

(58) Field of Classification Search
CPC .. C09K 3/1009; C09K 3/1012; B26D 1/0006; G05B 19/4069; G05B 19/4097; G05B 19/4099; G05B 2219/50144; G05B 2219/35134; G05B 2219/45145; G05B 2219/49007; H05K 13/046; B23C 2220/12; B23C 3/10
USPC .......................................................... 700/98
See application file for complete search history.

(56) References Cited

U.S. PATENT DOCUMENTS

| | | |
|---|---|---|
| 2004/0107019 A1 | 6/2004 | Keshavmurthy et al. |
| 2015/0193590 A1* | 7/2015 | Miles .................... A61B 34/10 |
| | | 700/98 |
| 2016/0031010 A1 | 2/2016 | O'Neill et al. |
| 2016/0144572 A1 | 5/2016 | Eimieh et al. |
| 2016/0288417 A1 | 10/2016 | Mccann et al. |
| 2016/0368077 A1 | 12/2016 | Swaminathan et al. |
| 2017/0014909 A1 | 1/2017 | Tanaka et al. |

* cited by examiner

METHODS OF MANUFACTURING ONE OR MORE DISCRETE OBJECTS FROM A BODY OF MATERIAL CREATED BY ADDITIVE MANUFACTURING

RELATED APPLICATION DATA

This application claims the benefit of priority of U.S. Provisional Patent Application Ser. No. 62/506,817, filed on May 16, 2017, and titled "METHODS OF MANUFACTURING ONE OR MORE DISCRETE OBJECTS FROM A BODY OF MATERIAL CREATED BY ADDITIVE MANUFACTURING," which is incorporated by reference herein in its entirety. This application further claims the benefit of priority of U.S. Provisional Patent Application Ser. No. 62/530,419, filed on Jul. 10, 2017, and titled "METHODS OF MANUFACTURING A PLURALITY OF DISCRETE OBJECTS FROM A BODY OF MATERIAL CREATED BY ADDITIVE MANUFACTURING" the entirety of which is incorporated herein by reference.

FIELD OF THE INVENTION

The present invention generally relates to the field of manufacturing. In particular, the present invention is directed to methods of manufacturing one or more discrete objects from a body of material created by additive manufacturing.

BACKGROUND

Many types of objects are manufactured using rotary-tool milling and other types of subtractive manufacturing processes. Typically, a single object is, or multiple objects are, made from a single body of material, such as a block or slab of steel or aluminum. For example, steel and aluminum parts for any of a wide variety of assemblies are often machined from individual bodies of material using one or more milling machines. However, making such machined parts can be labor intensive as operators load and unload individual bodies of material to and from milling machines. In addition, geometries are generally limited to those that can be manufactured economically by a subtractive manufacturing process.

SUMMARY OF THE DISCLOSURE

In an aspect, a method of manufacturing a plurality of discrete objects from a body of material created by additive manufacturing includes receiving an additively manufactured body of material including a plurality of interconnected structures. The method includes receiving a frame having at least an opening. The method includes placing the additively manufactured body of material within the opening of the frame. The method includes installing removable fixating material around the additively manufactured body of material and within the opening of the frame, so that the removable fixing material and the additively manufactured body of material form a stabilized workpiece. The method includes forming, by subtractive manufacturing, the plurality of discrete objects from the body of material. The method includes removing the removable fixating material.

In another aspect, a system for manufacturing a plurality of discrete objects from a body of material created by additive manufacturing using an automated manufacturing device includes an automated manufacturing device, the automated manufacturing device including at least a controller configured to receive at least a graphical model of a plurality of structures, receive at least a graphical representation of at least an interconnecting portion, the at least an interconnecting portion connecting at least a first structure of the plurality of structures to at least a second structure of the plurality of structures, and generate a graphical representation of an additively manufacture body of material, as a function of the graphical model of the plurality of structures, and the graphical representation of the at least an interconnecting portion.

In another aspect, a method of manufacturing a plurality of discrete objects from a body of material created by additive manufacturing includes receiving, at an automated manufacturing device, at least a graphical model of a plurality of structures and at least a graphical representation of at least an interconnecting portion, wherein the at least an interconnecting portion connects at least a first structure of the plurality of structures to at least a second structure of the plurality of structures. The method includes generating a graphical representation of an additively manufacture body of material, as a function of the graphical model of the plurality of structures, and the graphical representation of the at least an interconnecting portion.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
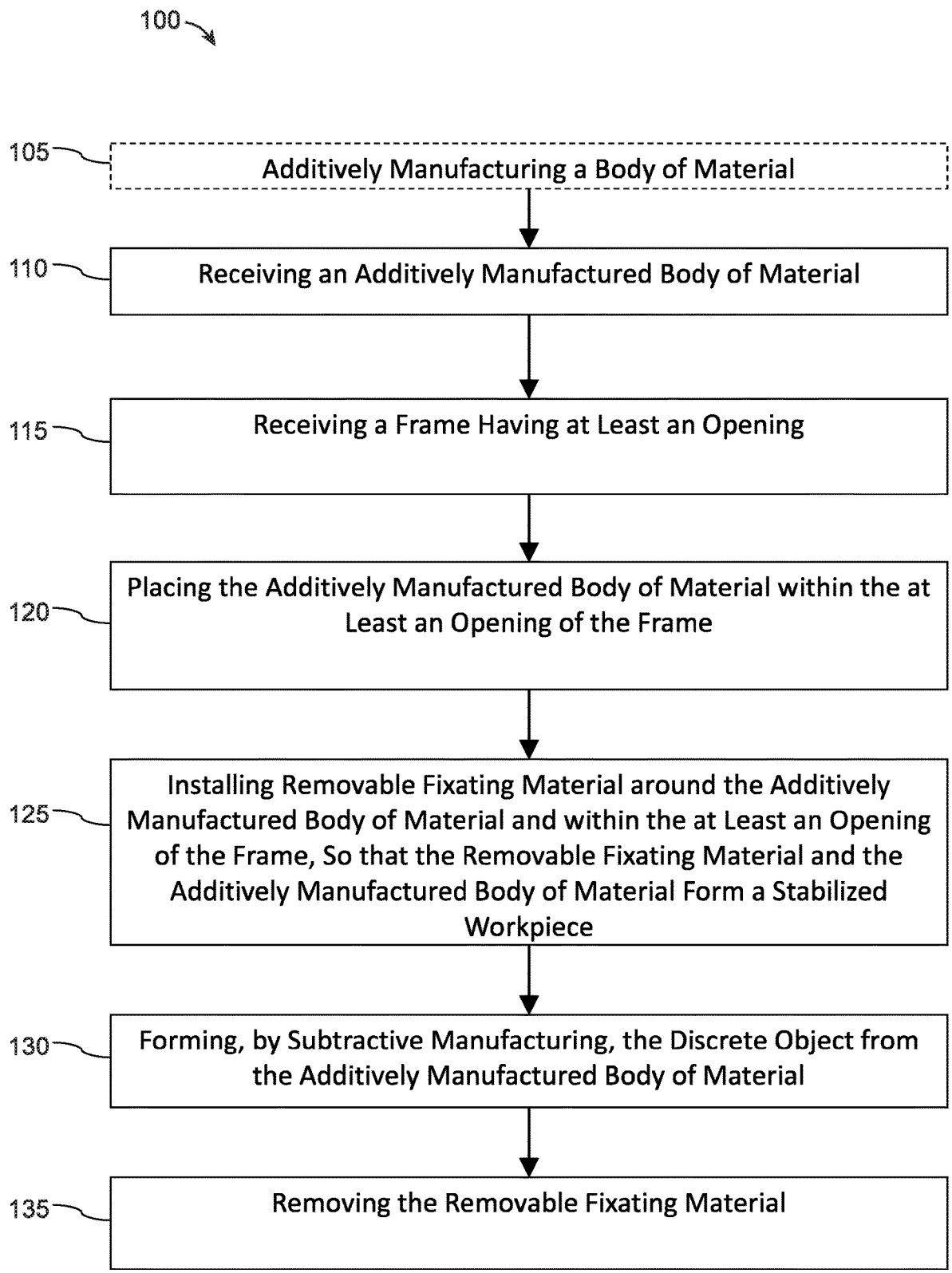
FIG. 1 is a flow diagram illustrating an exemplary method of manufacturing a discrete object from an additively manufactured body of material in accordance with the present invention.

In one aspect, the present invention is directed to methods of manufacturing a discrete object from a body of material created by additive manufacturing using a temporary fixating material to firmly hold the one discrete object in place while it is being formed by one or more subtractive manufacturing processes. In another aspect, the present invention is directed to methods of manufacturing a plurality of discrete objects from a body of material created by additive manufacturing using a temporary fixating material to firmly hold the one or more discrete objects in place while they are being formed by one or more subtractive manufacturing processes. In an embodiment, a peripheral frame is provided, for example, to aid in: containing fixating material; handling; datum referencing; and/or object layout, among other things. Examples of discrete objects that can be manufactured using techniques disclosed herein include, but are not limited to, finished parts that may ultimately be assembled into a finished product (such as consumer products, military equipment, commercial equipment, among others), precursors to finished parts (such as precursors that may require further processing to create finished parts for assembly), finished standalone products, and precursors to finished standalone products, among others An example of a stabilized workpiece is a mass combining at least one additively manufactured body of material and removable fixating material in a monolithic unit that may treated as a single object for the purposes of subtractive manufacturing; installation of a fixating material insures that the body of material and one or more discrete objects remain substantially fixed in position during the subtractive manufacturing process. Herein the terms "part" and "object," and the plural forms of these terms, may be used interchangeably. It is noted that for any given additively manufactured body of material, multiple discrete parts may all be identical to one another or may all be different from one another or some may be identical and others may be different. As used herein, a "precursor" to a finished discrete object may be an object that requires further processing to become a finished discrete object; e.g., an object liberated from a body of material from which it is made or additively manufactured, for which further processing steps are required to produce a finished object or an object that by subtractive manufacturing achieves one or more tolerances, flatnesses, surface finishes and/or features.

An additively manufactured body of material may be produced by an additive manufacturing process. In an embodiment, an additive manufacturing process is a process in which material is added incrementally to a body of material in a series of two or more successive steps. A material may be added in the form of a stack of incremental layers; each layer may represent a cross-section of an object to be formed upon completion of an additive manufacturing process. Each cross-section may, as a non-limiting example be modeled on a computing device, such as a computing device as described in further detail below in reference to FIG. 19, as a cross-section of graphical representation of the object to be formed; for instance, a computer aided design (CAD) tool may be used to receive or generate a three-dimensional model of an object to be formed, and a computerized process may derive from that model a series of cross-sectional layers that, when deposited during an additive manufacturing process, together will form the object. Steps performed by an additive manufacturing system to deposit each layer may be guided by a computer aided manufacturing (CAM) tool. In an embodiment, a series of layers are deposited in a substantially radial form, for instance by adding a succession of coatings to the workpiece. Similarly, a material may be added in volumetric increments other than layers, such as by depositing physical voxels in rectilinear form or other forms. Additive manufacturing, as used in this disclosure, may include manufacturing done at an atomic or nano level. Additive manufacturing may also include manufacturing bodies of material that are produced using hybrids of other types of manufacturing processes; for instance, additive manufacturing may be used to join together two portions of a body of material, where each portion has been manufactured using a distinct manufacturing technique. A non-limiting example may be a forged body of material. an example of a forged body of material may have welded material deposited upon it, which then comprises an additive manufactured body of material.

Deposition of material in an additive manufacturing process may be accomplished by any suitable means. Deposition may be accomplished by stereolithography, in which successive layers of polymer material are deposited and then caused to bind with previous layers using a curing process such as curing using ultraviolet light, for example. Additive manufacturing processes may include "three-dimensional printing" processes that deposit successive layers of powder and binder; the powder may include polymer or ceramic powder, and the binder may cause the powder to adhere, fuse, or otherwise join into a layer of material making up the body of material or product. Additive manufacturing may include metal three-dimensional printing techniques such as laser sintering including direct metal laser sintering (DMLS) or laser powder-bed fusion. Likewise, additive manufacturing may be accomplished by immersion in a solution that deposits layers of material on a body of material, by depositing and sintering materials having melting points such as metals, such as selective laser sintering, by applying fluid or paste-like materials in strips or sheets and then curing that material either by cooling, ultraviolet curing, and the like, any combination of the above methods, or any additional methods that involve depositing successive layers or other increments of material. Methods of additive manufacturing may include without limitation vat polymerization, material jetting, binder jetting, material extrusion, fuse deposition modeling, powder bed fusion, sheet lamination, and directed energy deposition. Methods of additive manufacturing may include adding material in increments of individual atoms, molecules, or other particles. An additive manufacturing process may use a single method of additive manufacturing, or combine two or more methods. Companies producing additive manufacturing equipment include 3D Systems, Stratasys, formLabs, Carbon3D, Solidscape, voxeljet, ExOne, envisiontec, SLM Solutions, Arcam, EOS, Concept Laser, Renishaw, XJET, HP, Desktop Metal, Trumpf, Mcor, Optomec, Sciaky, and MarkForged amongst others.

Additive manufacturing may include deposition of initial layers on a substrate. Substrate may include, without limitation, a support surface of an additive manufacturing device, or a removable item placed thereon. Substrate may include a base plate, which may be constructed of any suitable material; in some embodiments, where metal additive manufacturing is used, base plate may be constructed of metal, such as titanium. Base plate may be removable. One or more support features may also be used to support additively manufactured body of material during additive manufacture; for instance and without limitation, where a downward-facing surface of additively manufactured body of material is constructed having less than a threshold angle of steepness, support structures may be necessary to support the downward-facing surface; threshold angle may be, for instance 45 degrees. Support structures may be additively constructed, and may be supported on support surface and/or on upward-facing surfaces of additively manufactured body of material. Support structures may have any suitable form, including struts, buttresses, mesh, honeycomb or the like; persons skilled in the art, upon reviewing the entirety of this disclosure, will be aware of various forms that support structures may take consistently with the described methods and systems.

Examples of additively manufactured bodies of material from which one or more discrete objects can be made include, but are not limited to, plates, slabs, blooms, billets, boards, blocks, among many other shapes, including curvilinear and multisided shapes, and any combination thereof, as set forth in further detail below. As for material(s) composing an additively manufactured body of material, the material(s) may be any suitable material(s), such as metal (solid, sintered, etc.), polymer (solid, foamed, etc.), composite, and multilayer material, among others. Fundamentally, there is no limitation on the composition of an additively manufactured body of material. An additively manufactured body of material may include at least one reference datum designed, configured, and located for precisely locating a stabilized workpiece relative to a subtractive manufacturing device, as described in further detail below. In an embodiment, and as described in further detail below, an additively manufactured body of material represents a "near net" discrete object that may share some geometric characteristics with a discrete object; for instance, an additively manufactured body of material may visually resemble a discrete object but lack threading, forming to a given tolerance, or one or more features more readily formed by subtractive manufacturing, for example. Additively manufactured body of material may be composed of a plurality of different materials.

A subtractive manufacturing process may be any suitable subtractive manufacturing process, such as, but not limited to, rotary-tool milling, electronic discharge machining, ablation, etching, erosion, cutting, and cleaving, among others. Fundamentally, there is no limitation on the type of subtractive manufacturing process(es) that may be used. In an example, differing subtractive manufacturing processes may be used before and after a fixating material has been installed, such that the subtractive manufacturing process used prior to installing the fixating material does not need to be compatible with the fixating material, whereas each subtractive manufacturing process after the fixating material has been installed may need to be compatible with the fixating material, for example, if it is used to remove any of the fixating material, incidentally or intentionally. Subtractive manufacturing may also be performed after a removal of fixating material.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In an embodiment, milling equipment used for removing material may be of the computerized numerical control (CNC) type that is automated and operates by precisely programmed commands that control movement of one or more parts of the equipment to effect the material removal. CNC machines, their operation, programming, and relation to CAM tools and CAD tools are well known and need not be described in detail herein for those skilled in the art to understand the scope of the present invention and how to practice it in any of its widely varying forms.

Subtractive manufacturing may be performed using spark-erosive devices; for instance, subtractive manufacturing may include removal of material using electronic discharge machining (EDM). EDM may include wire EDM, plunge EDM, immersive EDM, ram EDM, or any other EDM manufacturing technique. Subtractive manufacturing may be performed using laser-cutting processes. Subtractive manufacturing may be performed using water jet or other fluid jet cutting techniques. Fundamentally, any process for removal of material may be employed for subtractive manufacturing.

Referring now to the drawings, FIG. 1 illustrates an exemplary method 100 of manufacturing a discrete object from a body of material created by additive manufacturing. At optional step 105, an additively manufactured body of material is additively manufactured. Additively manufactured body of material may be additively manufactured using any method or combination of methods of additive manufacturing described above and those methods of additive manufacturing readily appreciated by a person of ordinary skill in the art after reading this disclosure in its entirety. In an embodiment, additively manufactured body may be manufactured having a form such as a slab or cylinder of material. In an embodiment, additive manufacturing of additively manufactured body of material includes additively manufacturing at least a geometric characteristic of discrete object. A geometric characteristic of discrete object is a feature, partial shape, or overall shape recognizable as similar to a feature, partial shape, or overall shape of the discrete object. For instance, where discrete object, when completed, has a substantially disc-shaped form, additively manufactured body of material may have a geometric characteristic of the discrete object where the additively manufactured body of material is substantially disc-shaped; additively manufactured body of material may lack one or more features of discrete object, such as particular dimensions of the substantially disk-shaped form, offset, beveled, flanged or otherwise varied features, surface recesses, grooves, or projections, or the like, and for example. In an example, where discrete object, when completed, includes one or more holes, body of material may possess a geometric characteristic of the discrete object where the body of material is additively manufactured already possessing at least a hole of the one or more holes; at least a hole in additively manufactured body of material may lack one or more features of at least a hole in discrete object, such as threading, a precise shape, dimensions, or broached features, or the like. Additively manufactured body of material may include substantially all features of discrete object, but may not include, for example, a lack of surface, finish, tolerance, or flatness of surfaces. In an embodiment, additively manufactured body of material may represent a "near net" discrete object that may share at least a geometric characteristic with discrete object; for instance, additively manufactured body may visually resemble discrete object but lack threading, forming to a given tolerance, forming to a surface finish, forming to a flatness, or one or more features more readily formed by subtractive manufacturing. In an embodiment, additively manufactured body of material may have some degree of warping; for instance, where additively manufactured body of material was produced by a process such as laser powder-bed fusion or DMLS that involves rapid heating and cooling, warping may occur as a result of the repeated heating and cooling, particularly where a layer with a larger cross-sectional area is constructed on top of a layer with a smaller cross-sectional area. In an embodiment, warping may be predicted by a model for additively manufacture body of material; additively manufactured body of material may be constructed with a greater volume than a discrete object to be produced therefrom, permitting subtractive manufacturing to shape discrete object in a manner correcting warping.

In an embodiment, additively manufacturing additively manufactured body of material may include creating a computer model of additively manufactured body of material. Computer model of additively manufactured body of material may be created by assigning a plurality of computer models of one or more differing structures to locations within a computer model of the body of material. Continuing with the description of an exemplary embodiment, this may be performed in any suitable manner, such as using CAD and/or CAM software having a graphical user interface that allows a user to manipulate graphical representations of the objects and/or body of material to effectively place or simulate one or more features of additively manufactured body of material or of discrete object. As part of step 105 or as part of another step in method 100 not specifically enumerated, computer model of additively manufactured body of material may be configured into a CAM model that in later steps of method 100 will be used to guide the operation of one or more additive manufacturing devices to perform the necessary material deposition for forming additively manufactured body of material in the proper number and sequence of steps.

In an embodiment, and still viewing FIG. 1, modeling may include detection of one or more geometric features of objects to be formed from body of material or of one or more precursor elements in body of material. Detection of one or more geometric features may include detection one or more features to form from body of material. This may be accomplished, as a non-limiting example, by receiving one or more user instructions indicating one or more features to form. Alternatively or additionally, an automated manufacturing device and/or controller may detect at one or more features to form by interrogating a computer model of one or more precursors and/or discrete objects. Interrogation, as used herein, is a process whereby a system incorporating at least a computing device, including without limitation an automated manufacturing device, controller, or computing device as described below, analyzes a graphical model of a body, discrete object, part, product, workpiece, or the like, and extracts information describing one or more features represented in the graphical model, either as existing features of the body discrete object, part, product, workpiece or the like, or as features to be added to and/or formed thereon. Information extracted during interrogation may include, without limitation, geometrical information, such as lengths, widths, heights, thicknesses, contours, bend radii, opening sizes and locations, volumes, etc.; part clearances; dimensional tolerances; materials; finishes; purchased components, such as mechanical fasteners, hinges, handles, latches, etc.; and certifications. Persons skilled in the art, upon reviewing the entirety of this disclosure, will be aware of various categories of data that may likewise be extracted during interrogation. In some embodiments, model-based pricing information may be considered to be parsed into "raw" variables and "processed" variables. Raw variable are variables that an interrogator can obtain directly from the computer-model data, and processed variables are variables generated by the interrogator from raw variables. Processed variables may be thought of as inputs needed for generating a price but that are not directly available from the computer-model data. In the context of an example for machining fabrication based on a SolidWorks® computer model, raw variables may include face count, surface count, hole count, and counter-bore count, and processed variables may include cutout volume and machining operation setup count.

Interrogation may involve parsing and/or analyzing a graphical model such as a three-dimensional computer model including without limitation a CAD model to identify separate elements thereof by reading specific commands issued by or to a modeling program used to create and/or modify the graphical model. Interrogation may involve parsing and/or analyzing a graphical model to identify specific routines or functions associated with such commands to determine whether they collectively define an individual element or portion (a "shape," "solid body," or "component") of a 3D computer model. Many CAD systems, including, by way of example, SolidWorks® (registered trademark of Dassault Systemes), include an application program interface (API) to enable a user to control the issuance of customized routines or functions associated with such commands. Interrogation may involve reading such commands, routines, and functions to determine whether they define an individual shape, and, if so, may analyze various geometric aspects of the defined shape to determine whether such aspects correspond to one or more manufacturing requirements for a product to be manufactured based on a 3D computer model.

As a non-limiting example of interrogation using or based on the SolidWorks CAD program, interrogation may involve reading the "FeatureManager Design Tree" (an outline representation of individual shapes) to determine the number of solid bodies (or shapes) in the design. Representations of individual shapes may be found in other CAD software files, and other CAD software systems may be used. In SolidWorks, one command usable to analyze the number of solid bodies is:

```
object[ ]bodies=(object[ ])part.GetBodies2((int)
    Const.swBodyType_e.swSolidBody,false);
``` and the output is a list of bodies. The foregoing code statement is listed by way of example only; other code statements or sequences may be used. Interrogation may involve analyzing geometric aspects of such identified shapes and comparing such aspects to corresponding manufacturing requirements. In an embodiment, these manufacturing requirements may include given starting materials. In general, interrogation may be performed using any method, facility, or combination thereof used for identifying features of a graphical model of an object, including without limitation methods or facilities used by CAD or CAM systems, for instance for toolpath generation.

In an embodiment, an automated manufacturing device, controller, or computing device may identify at least a feature to be formed by comparing a model of discrete object incorporating such features and/or a model of a part or product to be formed from discrete object to a model of discrete object in which such features are excluded. Interrogation may further provide a modification history of discrete object computer model indicating one or more features recently added by a user or automated process.

An automated manufacturing device, controller, or computing device may select a side of a precursor to be presented as a first face of additively manufactured body of material based on detected features; for instance, interrogation may produce data indicating that one or more features to form may be formed by presenting a given side of discrete object and/or precursor as a side of additively manufacture body of material to be machined or otherwise subtractively manufactured. A first side of a precursor may alternatively or additionally be specified by user input. Persons skilled in the art, upon review of the entirety of this disclosure, will be aware of various techniques, APIs, facilities, and/or algorithms for automated determination of orientations for manufacture of a given feature on a given discrete object and/or determination of feasibility of formation of a given feature from a given orientation, for instance using toolpath generation programs, machine-control instruction generation programs, "slicers," and the like.

Still referring to FIG. 1, a graphical representation of an interconnecting portion may be received from another machine or generated by a user in a modeling program such as a CAD program; user may generate computer model by assembling geometric components as described above. Graphical representation of an interconnecting portion may be generated as a function of one or more other graphical representations or computer models. The graphical representation of interconnecting portion may include a graphical representation of at least an interconnecting portion that joins at least two of the at least a precursor to the plurality of discrete objects. For instance, where graphical representation of an interconnecting portion includes a graphical representation of at least an interconnecting portion as described in further detail herein, graphical representation of an interconnecting portion may be generated as a function of two or more precursors represented by graphical representation of at least a precursor; the graphical representation of the at least an interconnecting feature may be generated to represent any shape, size, form, or material composition described above for at least an interconnecting feature.

At step 110, additively manufactured body of material is received. Step 110 may be accomplished by additively manufacturing additively manufactured body of material as at step 105. In an embodiment, additively manufactured body of material is received in pre-fabricated form. For example, additively manufactured body of material may be supplied by a third-party supplier. Where additively manufactured body of material has been constructed on, for instance, a base plate, additively manufactured body of material may be removed from base plate by severing one or more connections between additively manufacture body of material and base plate; for instance, additively manufactured body of material may be cut from base plate using wire EDM, a buzz saw, a CNC machine, or other means of cutting or severing material. Additively manufactured body of material may similarly be removed or cut from any other substrate on which additively manufactured body of material was deposited. One or more support features, such as one or more support features constructed to support additively manufactured body of material during additive manufacture, may be removed from additively manufactured body of material by any process described above for removal of material, including without limitation manual or automated processes.

At step 115, a frame having at least an opening is received. Frame may be constructed out of any suitable material or combination of materials, including without limitation metal (solid, sintered, etc.), wood, cardboard, polymer (solid, foamed, etc.), composite, and multilayer material, among others. Fundamentally, there is no limitation on the composition of frame. Frame may be constructed from a combination of various elements; for instance, frame may include a combination of brass, plastic, and aluminum parts.

A frame includes at least an opening. At least an opening may include a single opening or a plurality of openings, as described in further detail below. At least an opening may include a through-opening; In an embodiment, a through-opening is open on two sides of frame, so that an object placed into the through-opening falls out of the frame unless supported by additional objects or features, for instance as described in further detail below. In an embodiment, at least an opening includes a blind opening, or an opening having a floor; additively manufactured body of material may be placed upon floor, upon supports placed on floor or above floor and supported by other features of frame or structures attached to the additively manufactured body of material that then locate additively manufactured body of material within the opening, e.g. a rod or rods glued to the additively manufactured body of material that then rest on the frame, supporting the additively manufactured body of material within the opening. A floor of a blind opening may be integral to a frame, or may be one of a plurality of sections assembled to form the frame as described in further detail below. At least an opening may have any cross-sectional form, including a substantially rectangular form, any regular or irregular polygonal form, a substantially circular or elliptical form, any regular or irregular curved form, or any form combining polygonal and curved elements. The shape and size of at least an opening may be standardized; a standard shape and size of opening may be recorded in a computing device controlling the subtractive manufacturing device, or may be used to assume a location of points within the opening for the purposes of generating machine control instructions. For example, where a frame has a reference feature as described below, the shape and size of the opening may be used to locate the opening within a coordinate system used in the machine control instructions when the frame has been located using the reference feature.

In an embodiment, at least an opening is shaped to fit an additively manufactured body of material; for instance, at least an opening may have one or more geometric characteristics of the additively manufactured body of material. As a non-limiting example, where the additively manufactured body of material has a peripheral form, at least an opening may include an opening having a substantially similar peripheral form, albeit larger to admit the additively manufactured body of material. Continuing with the above example, the periphery of at least an opening may be modified by reference features or features configured to receive removable fixating material as set forth in further detail below. At least an opening may have any depth suitable for use with methods described in this disclosure.

Frame may be provided with any one or more of a variety of features, as needed, to effect a robust connection between the frame and a removable fixating material so as to hold a stabilized workpiece firmly in place during subsequent manufacturing, handling, and any other operation(s). In an embodiment, frame includes at least a feature designed and configured to receive removable fixating material, as described in further detail below and thereby form a mechanical interlock between the frame and the additively manufactured body of material. An at least a feature may include one or more recesses that admit removable fixating material when removable fixating material is in a fluid or pourable form, and retain removable fixating material that has hardened.

A frame may include at least a reference feature designed, configured, and located for precisely locating the stabilized workpiece relative to a subtractive manufacturing device. At least a reference feature may include the size and shape or the outer periphery of frame; for instance, the outer periphery of frame may have a predictable or standardized size and shape such that points in the frame are at predictable locations, relative to a coordinate system used to generate or implement machine control instructions, when frame is secured in or against a feature of subtractive manufacturing device. In an embodiment, at least a reference feature includes an attachment feature, such as one or more holes to admit bolts or studs, or one or more projections or recesses that fit a feature of subtractive manufacturing device; feature of subtractive manufacturing device may include the surface of a base table, rotary table, a fixture, or the like.

In an embodiment, receiving frame further includes additively manufacturing the frame. Receiving a frame may include additively manufacturing a portion of the frame; for instance, the frame may initially have a gap which is filled using additive manufacturing; likewise, a plurality of sections making up the frame may be joined using additive manufacturing processes. Frame may be additively manufactured using any process or combination of processes used to additively manufacture additively manufactured body of material as described above. Any feature of frame may be formed using additive manufacturing, including at least a reference feature, at least a feature designed and configured to receive removable fixating material, and at least an opening. In an embodiment, receiving frame further includes subtractively manufacturing the frame. Frame may be subtractively manufactured by removal of material from a blank by machining processes. Any feature of frame may be formed using subtractive manufacturing including at least an opening. In an embodiment, frame is manufactured using a combination of additive and subtractive manufacturing steps. In an embodiment, a prefabricated frame is received, and one or more features are added using additive or subtractive manufacturing. Receiving frame may also be accomplished by receiving a prefabricated frame, or by reusing a frame that has been used in a previous manufacturing method, including without limitation any method described in this disclosure. In an embodiment the frame may be integral to additively manufactured body of material, e.g. additively manufactured at the same time as the body of material containing the final discrete object and connected to the additively manufactured body of material so that there is an additively manufactured body of material containing both the frame and pre-subtractively manufactured discrete object amongst other geometry.

Additively manufacturing frame may include generating a graphical model of the frame; generating a graphical model of the frame may be accomplished, as a non-limiting example, using a graphical or computer model of an additively manufactured body of material as described in further detail herein. For instance, a computer model of frame may be selected from a stored plurality of computer models of frames, based on a size or dimension of additively manufactured body of material; computer model of frame may be selected as a stored computer model of a frame having a minimal opening large enough to accommodate additively manufactured body of material.

In an embodiment, receiving a frame further includes assembling frame from a plurality of sections. As a non-limiting example, there may be two or more sections of frame that, when assembled, define at least an opening; for instance, at least an opening may have an interior surface, a first fractional portion of which is a surface of a first section, and a second fractional portion of which is a surface of a second section, the first section and second section able to be joined to form the complete interior surface. A plurality of sections may include a base section that, when added to frame, converts at least an opening from a through-opening to a blind opening. In an embodiment, a plurality of sections includes two or more lateral sections that define a periphery of at least an opening; in an embodiment, a portion of frame defining the periphery of at least an opening is fused or monolithic, and assembling the frame includes adding the base element. An assembled frame may be fastened together, taped together, or clamped or vised together, for instance using feature of the subtractive manufacturing device used to secure the stabilized workpiece. In an embodiment, the one or more sections may be assembled in a manner that adjusts the size or shape of the at least an opening; as a non-limiting example, frame may include a container with an open top, such as a five-sided rectangular box, and one or more elongate members such as rods, that rest on the top. Sliding one or more rods in different directions may divide the open top into differently sized and/or shaped openings. As a non-limiting example, one or more elongate members may be four elongate members that are free to slide along open top, creating vertices of a quadrilateral form at their intersections; the quadrilateral form may be a parallelogram, rectangle, trapezoid, square, or the like. As a non-limiting example continued from above, sides may be made of a self-sealing or material that can be sealed and elongate members may protrude through the sides at one or multiple different heights. A user may slide elongate members to choose a desired shape and size for quadrilateral form to match the quadrilateral form to the size and shape of the additively manufactured body of material. In an embodiment, container has an open bottom as well; for instance, the container may be a sidewall like the sidewall of a box, forming a loop of sidewall the top of which is the open top. Sidewall may be formed by joining one end of a strip of material to another end.

Additively manufactured body of material may include at least a portion of frame. For instance, in an embodiment, entire frame is included in additively manufactured body of material. In an embodiment, only part of frame is included; for instance, where frame is rectangular, one side of frame may be included in additively manufactured body of material, while three remaining sides are not. At least a portion of frame may fill a gap in the remainder of frame as provided. At least a portion of frame may fit into a slot or recess in frame. At least a portion of frame may fit over a projection of the rest of frame. At least a portion of frame may be manufactured in the same additive manufacturing process as additively manufactured body of material. Thus, steps 110 and 115 may be performed simultaneously; in addition step 120 below may be performed in the same process, locating additively manufactured body of material in frame. Frame may be otherwise connected to additively manufactured body of material, for instance by a bridging structure or other connecting object (not shown). In an embodiment, and as a non-limiting example, an interconnecting portion and/or bridging form may be formed between additively manufacture body of material and at least a portion of frame, according to any method described below for modeling and/or additively manufacturing an interconnecting portion and/or bridging form between two precursors or other portions of additively manufacture body of material. At least a portion of frame may be additively manufactured from a model of at least a portion of frame; for instance, and without limitation, a graphical representation of frame may be stored in a database or other data store, and may have one or more indicia indicating an at least a portion of frame to be additively manufactured. Additive manufacturing control instructions may be generated from such a model and/or model of an interconnecting portion or bridging structure using a slicer or similar element.

At step 120, the additively manufactured body of material is placed in the at least an opening. Where additively manufactured body of material is placed in a blind opening, the additively manufactured body of material may be set on a floor of the blind opening; where additively manufactured body of material is placed in a through opening, additively manufactured body of material may rest on a surface on which frame rests; surface may include a tray as described in further detail below.

In an embodiment, placing further includes locating additively manufactured body of material in a precise position relative to frame. Locating additively manufactured body of material may be performed using physical measurements from a precisely located feature of frame; for instance, where frame includes at least a reference feature as described above, additively manufactured body of material may be located in at least an opening by measuring from at least a reference feature to a feature of additively manufactured body of material. As a non-limiting example, where at least an opening includes a substantially rectangular opening having a standard form and body of material is a substantially regular shape having a standard form, sides of additively manufactured body of material may be placed particular distances from sides of the substantially rectangular opening. Physical placement may be guided by any suitable measurement technique, including without limitation graduated rulers, calipers, scanning devices, or linear displacement sensors. Similarly, where frame and additively manufactured body of material are placed on a tray as set forth in further detail below, tray may have indicia or surface features that guide the precise placement of frame and additively manufactured body of material, which may include support features as described in further detail below. Where receiving additively manufactured body of material includes additively manufacturing additively manufactured body of material, additively manufactured body of material may be manufactured in a precise location within at least an opening; frame and additively manufactured body may be additively manufactured together using the same coordinate system, for instance where frame is part of additively manufactured body of material, or where a part of frame is a part of additively manufactured body of material. This process may be supported by modeling a graphical representation of additively manufactured body of material within a graphical model of at least an opening in a graphical model of frame. Alternatively, frame may be located, using one or more reference features of frame, within a coordinate system used to manufacture additively manufactured body of material, with the result that additively manufactured body of material is at a precise location within at least an opening. In an embodiment, machine control instructions used to manufacture discrete object may be generated using known location of precisely located additively manufactured body of material, for instance by locating additively manufactured body of material within frame, and locating frame within secondary manufacturing device coordinate system using at least a reference feature.

In an embodiment, additively manufactured body of material is not located precisely within at least an opening. Subtractive manufacturing device may be set up to have an origin of a coordinate system at a particular feature of additively manufactured body of material; setup may be performed by a user or robot, for instance by advancing a mill of subtractive manufacturing device and moving mill relative to additively manufactured body of material until mill contacts a chosen feature of additively manufactured body of material to establish an origin point. Further measurements or calibration may be used to orient additively manufactured body of material relative to coordinate axes. In addition a 2D or 3D scanner could be used to precisely locate additively manufactured body of material in relation to the frame. As non-limiting example, a scanner may be attached to the subtractive manufacturing device which digitally scans frame and additively manufactured body of material and uses the resulting point cloud to generate a unified additively manufactured body of material from which machine instructions may be generated or to which previously generated machine instructions may be mapped. Persons skilled in the art will be aware of many techniques for precisely locating a workpiece within a manufacturing device, for instance to permit the manufacturing device to follow automated toolpaths in performing manufacturing steps on the workpiece.

At step 125, removable fixating material is installed around additively manufactured body of material and within at least an opening of frame, so that the removable fixating material and the additively manufactured body of material form a stabilized workpiece. A purpose of removable fixating material is to temporarily firmly support, i.e., stabilize, additively manufactured body of material during one or more subtractive manufacturing processes that will be remove material from the additively manufactured body of material to create discrete object. Installation of removable fixating material forms a stabilized workpiece containing at least the removable fixating material and additively manufactured body of material; In an embodiment, a stabilized workpiece is a workpiece each element of which is sufficiently immobilized throughout a manufacturing process to maintain integrity of a coordinate system used by a subtractive manufacturing device to compute manufacturing steps. Thus, in a stabilized workpiece, additively manufactured body of material does not fall out of the stabilized workpiece or shift its position within the stabilized workpiece. Removable fixating material may encase substantially all of additively manufactured body of material; In an embodiment, removable fixating material partially encases additively manufactured body of material. Fundamentally, there is no limit to the degree to which additively manufactured body of material protrudes from removable fixating material; In an embodiment as described further below removable fixating material encases all or substantially all of additively manufactured body of material for other purposes. In an embodiment a substantial portion of additively manufactured body of material remains exposed outside of the removable fixating material.

Examples of removable fixating materials suitable for use as removable fixating material at step 125 include waxes (such as machining waxes available from Freeman Manufacturing & Supply Company, Avon, Ohio) and metal alloys (such as low melt/fusible alloys available from RotoMetals of San Leandro, Calif.) that are melted for installation and removal but are sufficiently firm at subtractive manufacturing ambient temperatures and other materials that can be installed in a fluid form and harden when needed to provide the requisite firm support and can be removed without damaging the discrete object, such as by melting, dissolving by water or other fluid, etc. In an embodiment, where additively manufactured body of material is located in a blind opening, removable fixating material may be installed by pouring the removable fixating material into the blind opening, and around the additively manufactured body of material; blind opening may be formed either with a base element that is fused or integrally connected to the remainder of frame, or with a removable base section. Where a removable base section is used, the base section may be removed once removable fixating material has solidified, permitting manufacture on either side of a through opening thus revealed; where base section is integral to frame, base section may be partially or completely removed using subtractive manufacturing as described in further detail below.

Where additively manufactured body of material is located in an opening of the at least an opening that is a through opening, frame and additively manufactured body of material may be placed in a tray having a lip or walls that prevent fluid from escaping the tray. In any case, the tray or blind opening may function as a mold that allows the removable fixating material to fill at least an opening and surround additively manufactured body of material. After the removable fixating material hardens, additively manufactured body of material is stabilized and at least partially encased in the removable fixating material, creating a stabilized workpiece that is removed from the mold for further processing. Removable fixating material may fill entire opening, or may fill the opening partway, leaving more of additively manufactured body of material exposed, while retaining sufficient removable fixating material to stabilize the stabilized workpiece.

At step 130, discrete object is formed, by subtractive manufacturing, from additively manufactured body of material. In an embodiment, prior to performing subtractive manufacturing steps, frame is partially or completely disassembled. For instance, where frame includes a separate base section attached to convert at least an opening from a through opening to a blind opening for the installation of removable fixating material, removable base section may be removed prior to subtractive manufacturing steps. Similarly, where frame was assembled from a plurality of sections, the plurality of sections may be disassembled to remove some or all of frame from stabilized workpiece; in embodiments where frame includes a reference feature, a section of frame including reference feature may be left attached to stabilized workpiece. In an embodiment, frame is disassembled and removed completely. Similarly, if frame and additively manufactured body of material were placed in a tray while removable fixating material was added, frame and additively manufactured body of material may be removed from the tray. In addition, some fixating material may also be removed, e.g. fixating material that is outside of frame.

Stabilized workpiece may be located at subtractive manufacturing device prior to performance of step 130. Where frame remains a part of stabilized workpiece, frame may be located at subtractive manufacturing device, for instance using at least a reference feature of frame; additively manufactured body of material may be located by the same process where additively manufactured body of material has been located in a precise position relative to frame. In an embodiment, additively manufactured body of material is located at subtractive manufacturing device using one or more reference features of additively manufactured body of material. In an embodiment, additively manufactured body of material is located less precisely, and subtractive manufacturing device is then adjusted so that it works from a coordinate system referring to additively manufactured body of material, as described above. Persons skilled in the art will be aware that subtractive manufacturing devices have standardized tools that can locate workpieces and adjust for workpieces such as a frame that are not aligned precisely in an x-y plane or other two or three-dimensional space.

Step 130 may be performed using a subtractive manufacturing device. Subtractive manufacturing device may be operated manually or automatically or a combination of both. In an embodiment, subtractive manufacturing device is programmed by one or more machine control instructions; the one or more machine control instructions may be executed using a microcontroller or other computing device imbedded in or attached to subtractive manufacturing device. Subtractive manufacturing device may include one or more cutting tools or abrading tools, including but not limited to mills. Forming discrete object may be performed by removing material according to any method described above for subtractive manufacturing. As a non-limiting example, subtractive manufacturing may include milling. Subtractive manufacturing may include the use of EDM, lasers, plasma cutters, water jets, and lathes. Subtractive manufacturing may include a flexible manufacturing system where stabilized workpieces are mounted on tombstones and the tombstones are loaded into a subtractive manufacturing machine for subtractive manufacturing. Loading and unloading of stabilized workpieces may or may not occur at a location of subtractive manufacturing machine and in a flexible manufacturing system may be shunted to the next available appropriate subtractive manufacturing machine.

Step 130 may include performing multiple positionings of stabilized workpiece at one or more secondary manufacturing devices; multiple positionings may be performed by using reference features of frame or additively manufactured body of material to located stabilized workpiece in a plurality of different positions within a coordinate system used by a secondary manufacturing device. In an embodiment, subtractive manufacturing may create new features within the stabilized workpiece which may be used as reference features for repositioning. Multiple positionings may be performed with multiple machine setup by using reference features of frame or additively manufactured body of material to located stabilized workpiece in a plurality of different positions within a coordinate system used by a secondary manufacturing device. For instance, frame may be positioned with a first side up for some machining steps, then flipped with that side down for subsequent steps; frame may also be turned about a vertical axis and repositioned using reference features. A stabilized workpiece without a frame or with a partial frame may be similarly repositioned. Multiple positionings may be arranged by performing multiple machine setups; i.e., an origin or other reference point of secondary manufacturing device may be placed at a first location on stabilized workpiece for a first set of secondary manufacturing steps and at a second location on stabilized workpiece for a second set of manufacturing steps, and at further locations as desired for additional steps. Alternatively, multiple positionings may occur on multiple subtractive manufacturing machines.

In an embodiment, step 130 includes removing a portion of frame using subtractive manufacturing. For instance, where frame includes an integrally attached base portion that makes at least an opening a blind opening, the integrally attached bottom may be removed by subtractive manufacturing so that the side of the stabilized workpiece covered by the base portion may be accessed for subtractive manufacturing. Lateral portions of frame may be partially or wholly removed to permit access to a side of the stabilized workpiece. Step 130 may include removal of some of the removable fixating material using subtractive manufacturing; for instance, where a portion of additively manufactured device is submerged beneath removable fixating material during installation of removable fixating material, the removable fixating material above that portion may be removed during subtractive manufacturing at step 130. In an embodiment, where stabilized workpiece is placed on a trunnion table, subtractive manufacturing device may remove material from more than one side of stabilized workpiece in one setup; in that situation, stabilized workpiece may be mounted to trunnion table with all or part of frame removed, allowing machining from multiple directions. For instance, a base portion of frame may remain attached to stabilized workpiece, and fixed to trunnion table or rotary table.

At step 135, removable fixating material is removed. Removable fixating material may be removed using any process suitable for the type of removable fixating material that needs to be removed. For example, if removable fixating material is wax, wax-based, thermoplastic, thermoplastic-based, low melt metal alloy or low melt alloy based, the removal process may involve heating the removable fixating material to a temperature above its melting temperature and allowing the molten material to flow out of stabilized additively manufactured body of material. As another example, if removable fixating material is made of a material dissolvable in water or other liquid, the removal process may involve submerging stabilized additively manufactured body of material in a bath of such liquid or spraying the stabilized additively manufactured body of material with such liquid, among other things. Once removable fixating material has been removed, discrete object and frame, if any, are physically liberated from one another and can be handled accordingly. If frame is present, it may be saved and used again or it may be discarded (recycled), as desired. This is so regardless of whether frame was formed with additively manufactured body of material or originally provided as a discrete structure. In an embodiment, where frame includes a plurality of sections, the frame is disassembled.

In a further optional step (not shown), discrete object liberated from stabilized workpiece at step 135 may be further processed as desired to finish that object. Examples of further process include but are not limited to: secondary machining, polishing, painting, powder coating, plating, silk-screening, and any combination thereof, among others. Fundamentally, there is no limitation on the finishing steps, if any, that may occur at the optional step.

In the foregoing method, the transitions between steps and/or locations at which the steps are performed may vary from one instantiation to another. For example, in an instantiation in which there is a milling machine, such as a CNC milling machine having a movable horizontal x-y bed and a rotational milling tool that moved in the z (vertical) direction, once a CAM model of stabilized workpiece, if any, has been provided to the milling machine and stabilized workpiece is properly located for machining by the CNC milling machine, the machine may be controlled to perform step 130 of method 100 so as to subtractively manufacture one or more features or shapes on a first side of the stabilized workpiece while leaving the stabilized workpiece together. Once CNC milling machine has completed machining on one side of stabilized workpiece one or more workers, robot, or another machine may move the partially milled stabilized workpiece to a different position at the machine, to permit machining of a second side of stabilized workpiece, as further illustrated below. One or more workers or robotic devices may add removable fixating material at a separate location within the manufacturing location, or even a geographically separate location, or alternatively, at the machine; for example, in some instantiations, the additively manufactured body of material and frame may be placed on the horizontal x-y bed of the CNC milling machine, where a worker, robotic arm, etc., could install the removable fixating material at step 115. In addition, if removable fixating material is installed at subtractive manufacturing device, means may be provided to assist with hardening of the fixating material, such as by providing cooling if hardening happens through cooling of the fixating material.

Once a removable fixating material has hardened sufficiently, if the now stabilized workpiece is located away from the CNC milling machine, it is moved to CNC milling machine so that the milling machine can perform the subtractive manufacturing of step 130 on any side of the stabilized workpiece. If CNC milling machine can perform machining from only one side, then stabilized workpiece may be in a flipped orientation relative to its orientation during the first or subsequent milling operations of step 130. If CNC milling machine is capable of milling from multiple sides of a body of material, then the stabilized workpiece may not need to be moved at all prior to the completion of step 130. After the CNC milling machine has performed milling operations of step 130, stabilized workpiece, now consisting of discrete object and frame, if any, held together only by removable fixating material, may be moved to a location where the fixating material is removed to liberate the discrete object and frame, if any, from the stabilized workpiece.

Some or all of the steps of method 100 and/or intermediate handling steps between the steps of method 100 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a body of material among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each body of material from one machine to the next. Additionally, method 100 is exemplary and a person of ordinary skill in the art will, after reading this disclosure in its entirety will readily appreciate that method 100 may occur in a different order than show here.

Some or all of subtractive manufacturing steps as described above may be automatedly generated, for instance using a CAM program or the like, based on a graphical model of a precursor, discrete object, additively manufactured body of material, and/or frame. For instance, one or more machine-control instruction sets may be generated as described above from graphical model of a precursor, discrete object, additively manufactured body of material, and/or frame. Such machine-control instruction sets may be used to control one or more subtractive manufacturing machines to perform one or more subtractive manufacturing steps as described above.

Figure 2:
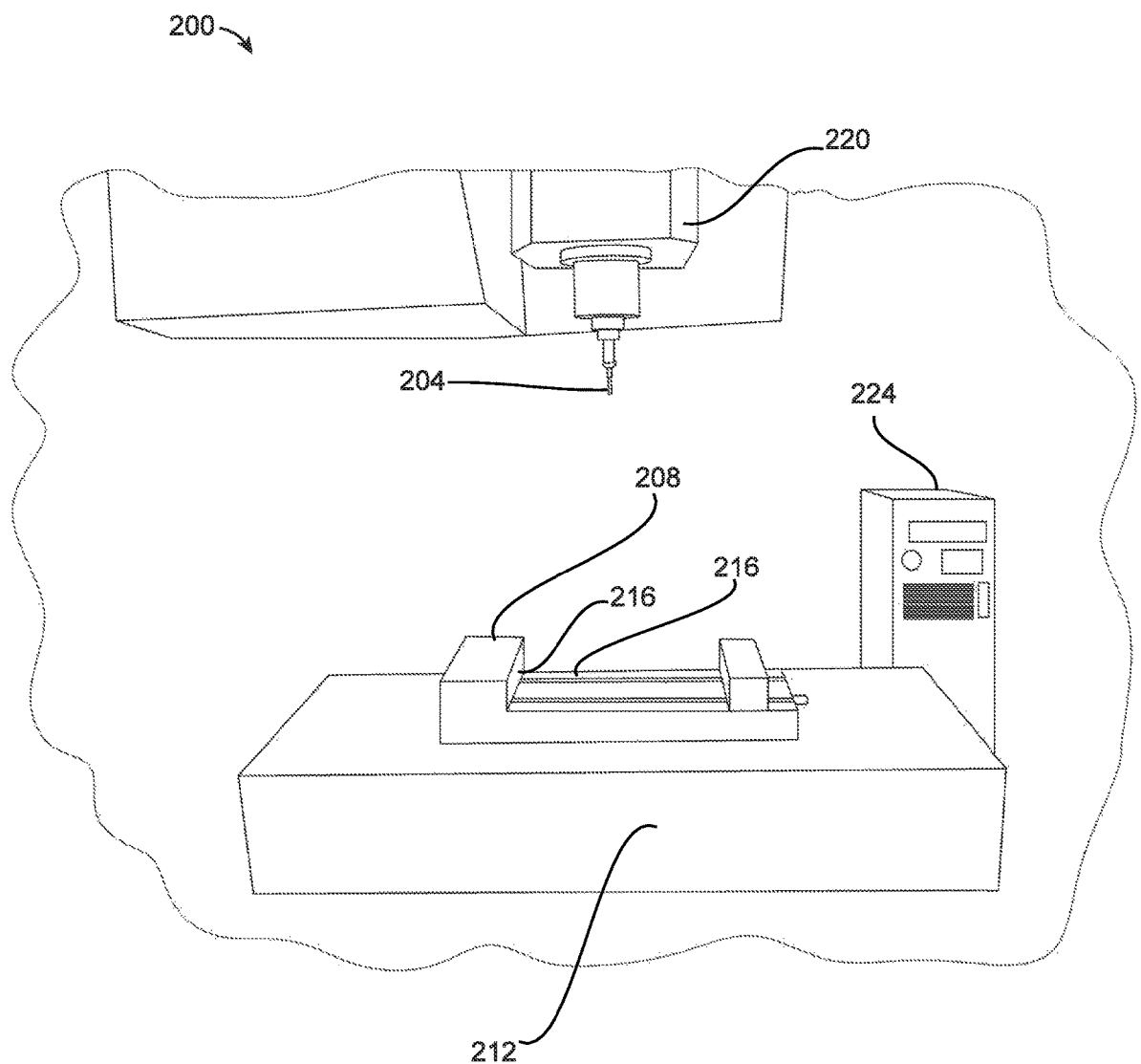
FIG. 2 is a schematic diagram illustrating an exemplary embodiment of a manufacturing device as disclosed herein.

Turning now to FIG. 2, an exemplary embodiment of a manufacturing device 200 that may be used in some embodiments to perform one or more manufacturing or computer modeling steps in embodiments of methods such as without limitation method 100 is illustrated. Manufacturing device 200 may include at least a manufacturing tool 204; in an embodiment, manufacturing tool 204 may be a component of manufacturing device 200 that performs one or more manufacturing steps as described above. Manufacturing tool 204 may perform one or more subtractive manufacturing steps as described above. Manufacturing tool 204 may include a cutting tool. Cutting tool may be a component that removes material from a workpiece. In some embodiments, cutting tool includes at least an endmill, which may be a component that removes material when rotated against a workpiece. Persons skilled in the art will be aware of many variants of endmill that may be used to remove material from a workpiece. Cutting tool may include a component that transfers motion from a motor (not shown) to at least an endmill; as a non-limiting example, component may be a spindle that rotates and as a result causes endmill to rotate.

Manufacturing tool 204 may include a tool changer that can switch a plurality of endmills onto and off of manufacturing tool 204; for instance, tool changer may detach an endmill currently attached to a spindle and attach a different endmill to the same spindle, enabling the automated manufacturing device to use more than one endmill in a single automated manufacturing process. Manufacturing tool 204 may include a tool changer that can switch a plurality of endmills onto and off of manufacturing tool 204. Manufacturing tool 204 may include a component used to perform EDM, such as a wire for wire EDM or an electrode. Manufacturing tool 204 may include one or more lasers. Manufacturing tool 204 may include one or more abraders.

Alternatively or additionally, manufacturing tool 204 may include at least an additive manufacturing tool capable of performing one or more additive manufacturing steps as described above. Manufacturing tool 204 may, as a non-limiting example, include one or more additive printer heads such as those used in rapid prototyping and/or "3D printing" processes, or the like. Manufacturing tool 204 may include an extruding device for extruding fluid or paste material, a sprayer or other applicator for bonding material, an applicator for powering, a sintering device such as a laser, or other such material. Furthermore, discrete object may be formed from precursor to a discrete object 304 by additive manufacturing.

Still referring to FIG. 2, manufacturing device 200 may include a support 208. In an embodiment, a support 208 may be a structure that supports a workpiece during the one or more manufacturing steps. Support 208 may include a base table 212. Base table 212 may include a surface to which a workpiece or other components may be secured. Surface may be oriented horizontally, vertically, or in any other orientation. Surface may be substantially planar. Base table 212 may include various mechanisms to attach components or workpieces to base table 212; for instance, base table 212 may include a quick release attachment mechanism that can be used to attach any component having appropriate attachment features such as quick-release studs.

Support 208 may include a fixture, which as used herein is a component used in a manufacturing device to secure a workpiece to the manufacturing device during the one or more manufacturing steps. A fixture may include, without limitation, one or more clamps, fasteners, vices, bolts, studs, quick-release attachment devices, straps, and chucks. A fixture may be one element of a set of fixtures; for instance, a workpiece may be secured in manufacturing device 200 by a plurality of fixtures, such as a plurality of bolts. Support 208 may include a vise, clamp, or other component used to locate or immobilize a workpiece within or at manufacturing device 200.

With continued reference to FIG. 2, manufacturing device 200 may include at least a locating feature 216. In an embodiment, at least a locating feature 216 may be at least a feature of manufacturing device 200 that enables a workpiece to be located at manufacturing device 200; in some embodiments, the at least a locating feature 216 enables a workpiece to be located precisely with regard to a coordinate system used to direct the one or more steps. At least a locating feature 216 may include, without limitation, one or more vices, clamps, projections, slots, recesses, or walls; for instance, the at least a locating feature 216 may include a surface of a vise jaw that is immobile with respect to another component such as a support 208 or base table 212, enabling precise prediction of surface's location, and thus of a workpiece surface set against it. At least a locating feature 216 may include a locating feature 216 on support 208; for example, the at least a locating feature 216 may include a bolt-hole, stud-hole, groove, or other recess in a base table 212, trunnion table, or fixture. As a non-limiting example, at least a locating feature 216 may include one or more grooves in a vice. At least a locating feature 216 may include a projection on a base table 212, trunnion table, or fixture. At least a locating feature 216 may include a combination of recesses and projections. The at least a locating feature 216 may include a plurality of locating features, or a single locating feature.

Continuing to refer to FIG. 2, in an embodiment, manufacturing device 200 may be a mechanical manufacturing device. In an embodiment, mechanical manufacturing device may be a manufacturing device 200 that deprives the user of some direct control over the toolpath, defined as movements the manufacturing tool 204 and workpiece make relative to one another during the one or more manufacturing steps. For instance, manufacturing tool 204 may be constrained to move vertically, by a linear slide 220 or similar device, so that the only decision the user may make is to raise or lower the manufacturing tool 204; as a non-limiting example, where manufacturing device 200 is a manually operated machine tool, user may only be able to raise and lower a cutting tool, and have no ability to move the cutting tool horizontally. Similarly, where manufacturing tool 204 includes a slide lathe, a blade on the slide lathe may be constrained to follow a particular path. As a further example, base table 212 may be moveable along one or more linear axes; for instance, base table 212 may be constrained to move along a single horizontal axis. In other embodiments, base table 212 is constrained to movement along two horizontal axes that span two dimensions, permitting freedom of movement only in a horizontal plane; for instance, base table 212 may be mounted on two mutually orthogonal linear slides.

With continued reference to FIG. 2, manufacturing device 200 may include a powered manufacturing device. In an embodiment, a powered manufacturing device may be a manufacturing device in which at least one component of the manufacturing device includes at least a component powered by something other than human power. At least a component may be powered by any non-human source, including without limitation electric power generated or stored by any means, heat engines including steam, internal combustion, or diesel engines, wind power, water power, pneumatic power, or hydraulic power. Powered components may include any components of manufacturing device 200. Manufacturing tool 204 may be powered; for instance, manufacturing tool 204 may include an endmill mounted on a spindle rotated by a motor (not shown). Workpiece support 208 may be powered. Where manufacturing device 200 is a mechanical device, motion of components along linear or rotary constraints may be powered; for instance, motion of base table 212 along one or more linear constraints such as linear slides may be driven by a motor or other source of power. Similarly, rotation of a table may be driven by a power source. Tool-changer, where present, may be driven by power. In some embodiments, all or substantially all of the components of manufacturing device 200 are powered by something other than human power; for instance, all components may be powered by electrical power.

Still referring to FIG. 2, manufacturing device 200 may include an automated manufacturing device. In some embodiments, an automated manufacturing system is a manufacturing device including a controller 224 that controls one or more manufacturing steps automatically. Controller 224 may include a sequential control device that produces a sequence of commands without feedback from other components of subtractive manufacturing device.

Controller 224 may include a feedback control device that produces commands triggered or modified by feedback from other components. Controller 224 may perform both sequential and feedback control. In some embodiments, controller 224 includes a mechanical device. In other embodiments, controller 224 includes an electronic device. Electronic device may include digital or analog electronic components, including without limitation one or more logic circuits, such one or more logic gates, programmable elements such as field-programmable arrays, multiplexors, one or more operational amplifiers, one or more diodes, one or more transistors, one or more comparators, and one or more integrators. Electronic device may include a processor. Electronic device may include a computing device. Computing device may include any computing device as described below in reference to FIG. 17.

Continuing to refer to FIG. 2, controller 224 may include a component embedded in manufacturing device 200; as a non-limiting example, the controller 224 may include a microcontroller, which may be housed in a unit that combines the other components of manufacturing device 200. Further continuing the example, microcontroller 224 may have program memory, which may enable microcontroller 224 to load a program that directs manufacturing device 200 to perform an automated manufacturing process. Similarly, controller 224 may include any other components of a computing device as described below in reference to FIG. 17 in a device housed within manufacturing device 200. In other embodiments, controller 224 includes a computing device that is separate from the rest of the components of manufacturing device 200; for instance, the controller 224 may include a personal computer, laptop, or workstation connected to the remainder of manufacturing device 200 by a wired or wireless data connection. As a non-limiting example, automated manufacturing device may include a controller 224, which may be coupled to other features thereof via network; in an embodiment, controller 224 may not be currently coupled to other materials, such that automated manufacturing device may include only controller. In some embodiments, controller 224 includes both a personal computing device where a user may enter instructions to generate a program for turning workpiece into a finished product, and an embedded device that receives the program from the personal computing device and executes the program. A person of ordinary skill in the art will readily appreciate, after reading the instant application in its entirety, the various ways that a controller 224, which may include one or more computing devices, may be connected to or incorporated in a manufacturing device 200 as described above.

With continued reference to FIG. 2, controller 224 may control components of manufacturing device 200; for instance, controller 224 may control elements including without limitation tool changer to switch endmills, spindle or gear systems operatively coupled to spindle to regulate spindle rotational speed, linear movement of manufacturing tool 204, base table 212, or both. As an example, in embodiments involving subtractive manufacturing, the equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms. Controller may be configured to initiate manufacture of an additively manufacture body of material and/or discrete object as described in further detail below. Persons skilled in the art, upon reading the entirety of this disclosure, will be aware of similar automated control systems usable for various forms of additive manufacturing.

Figure 11:
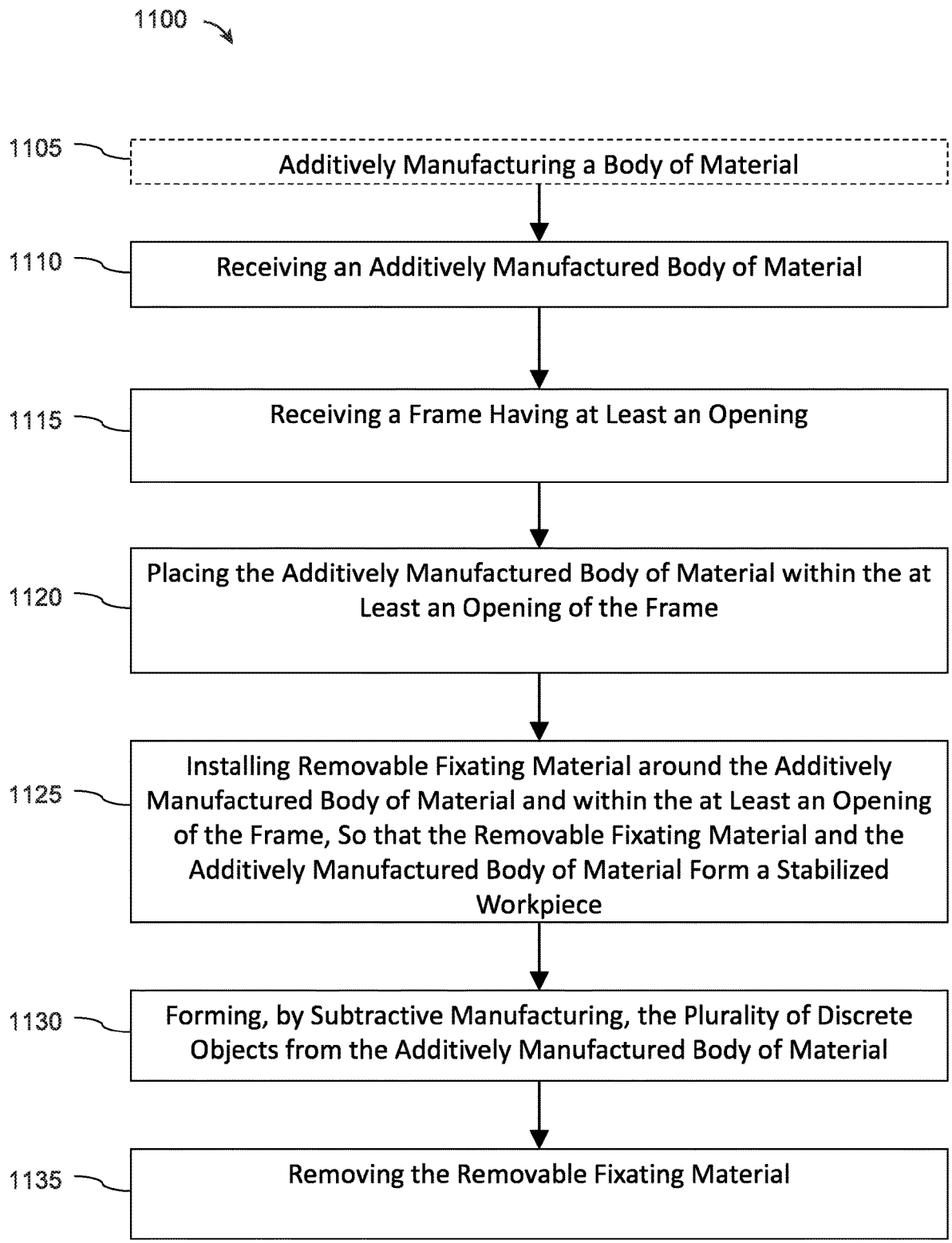
FIG. 11 is a flow diagram illustrating an exemplary method of manufacturing a plurality of discrete objects from an additively manufactured body of material in accordance with the present invention.
Figure 12:
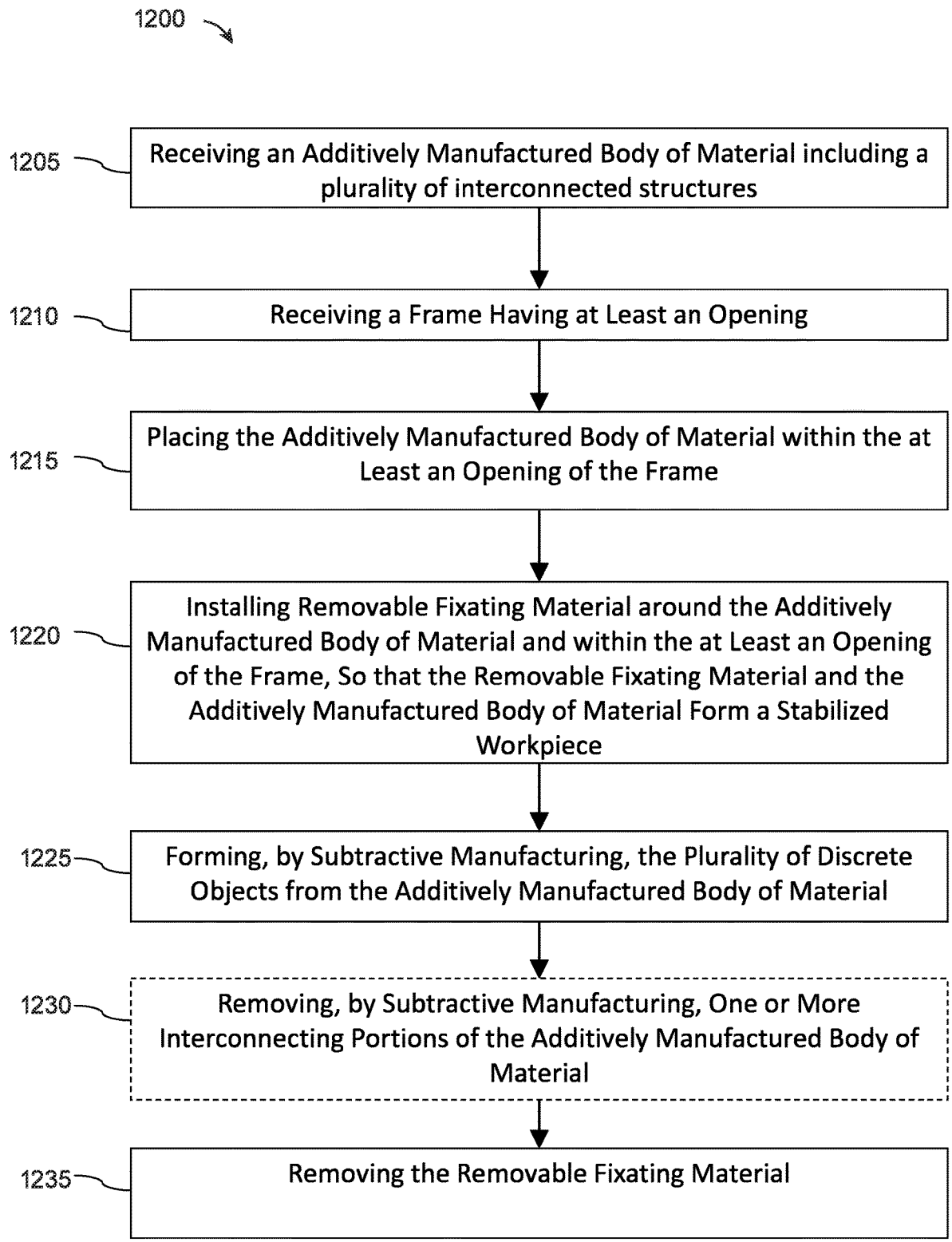
FIG. 12 is a flow diagram illustrating an exemplary method of manufacturing a plurality of discrete objects from an additively manufactured body of material in accordance with the present invention.

Still referring to FIG. 2, controller may be configured to perform any manufacturing modeling and/or other method step as disclosed herein, including without limitation as described herein in reference to FIGS. 1, 11, 12, and/or 18.

In an embodiment, controller 224 is configured to receive at least a graphical model of a plurality of structures, receive at least a graphical representation of at least an interconnecting portion, the at least an interconnecting portion connecting at least a first structure of the plurality of structures to at least a second structure of the plurality of structures, and generate a graphical representation of an additively manufacture body of material, as a function of the graphical model of the plurality of structures, and the graphical representation of the at least an interconnecting portion.

FIGS. 3A to 9 illustrate several examples of various steps of method 100 of FIG. 1. It is noted that throughout FIGS. 3A to 9, each and every occurrence of elements such as certain spaces, features, and interconnecting portions are not labeled for convenience and to avoid cluttering the figures. However, at least some are labeled, and those skilled in the art will readily understand where these elements exist though they are unlabeled. It should be further noted that FIGS. 3A-9 serve both as illustrations of physical objects resulting from particular stages in manufacturing device and of computer models of such physical objects, as generated and manipulated in methods and by systems described herein.

Figure 3A:
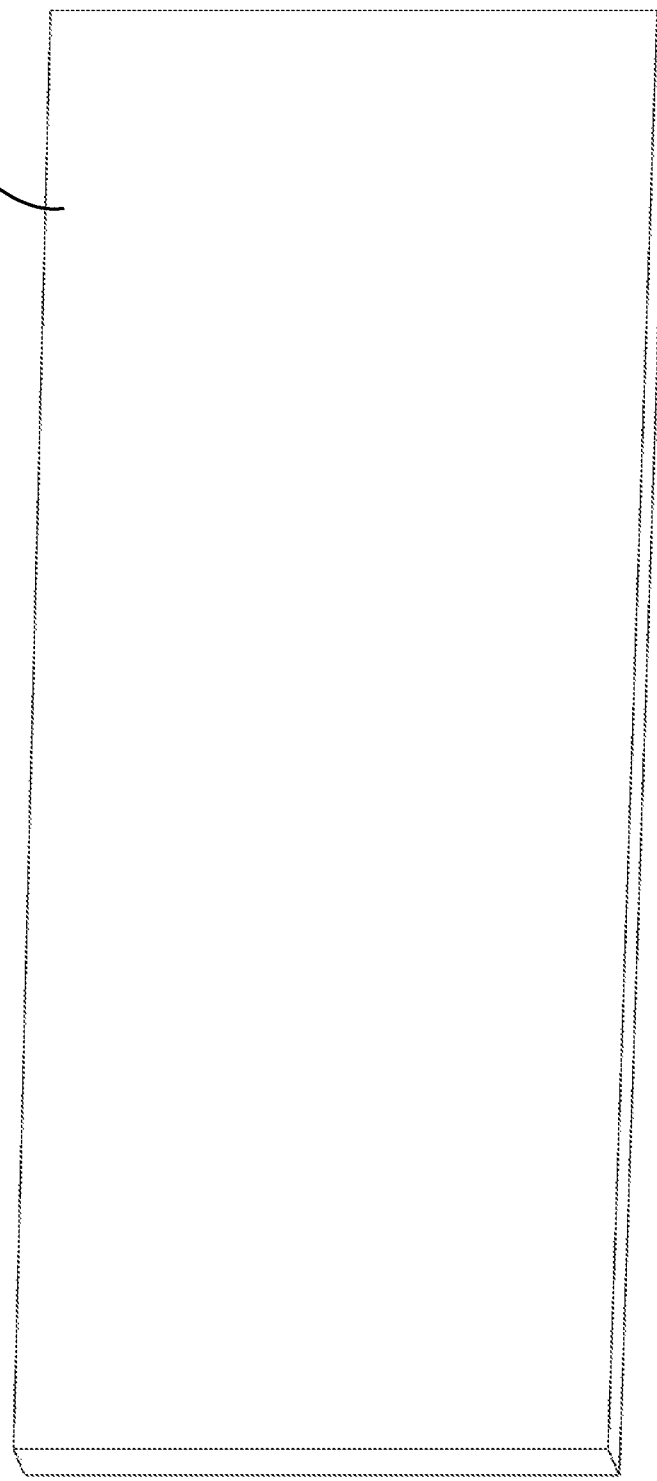
FIG. 3A is a perspective view of an exemplary additively manufactured body of material prior to subtractively forming a discrete object from the additively manufactured body of material.
Figure 3B:
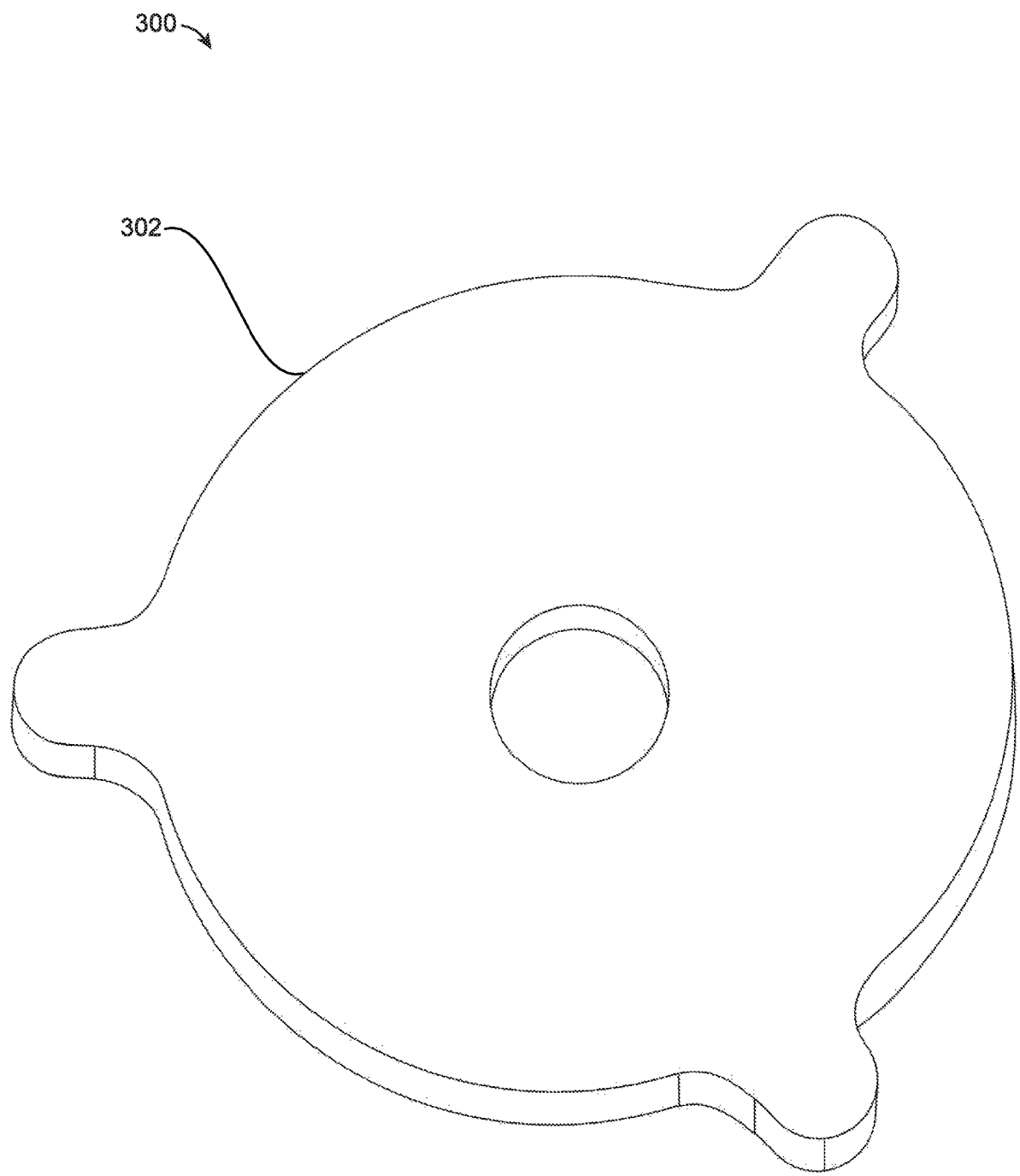
FIG. 3B is a perspective view of an exemplary additively manufactured body of material prior to subtractively forming a discrete object from the additively manufactured body of material.

FIG. 3A illustrates an exemplary embodiment of additively manufactured body of material 300 in the form of a rectangular slab 301; as noted above, additively manufactured body of material 300 may be formed from any desired material that can be formed using additive manufacturing. As another example, FIG. 3B illustrates another exemplary form 302 of additively manufactured body of material 300 which includes one or more geometric features of a discrete object to be formed from additively manufactured body of material 301, as described above. Additively manufactured body of material may, as a non-limiting example, be a "near net" discrete object as described above, with one or more features to be formed or modified by subtractive manufacturing as further illustrated below.

FIG. 3A illustrates an exemplary embodiment of additively manufactured body of material 300 in the form of a rectangular slab 301; as noted above, additively manufactured body of material 300 may be formed from any desired material that can be formed using additive manufacturing. As another example, FIG. 3B illustrates another exemplary form 302 of additively manufactured body of material 300 which includes one or more geometric features of a discrete object to be formed from additively manufactured body of material 301, as described above. Additively manufactured body of material may, as a non-limiting example, be a "near net" discrete object as described above, with one or more features to be formed or modified by subtractive manufacturing as further illustrated below.

Figure 3C:
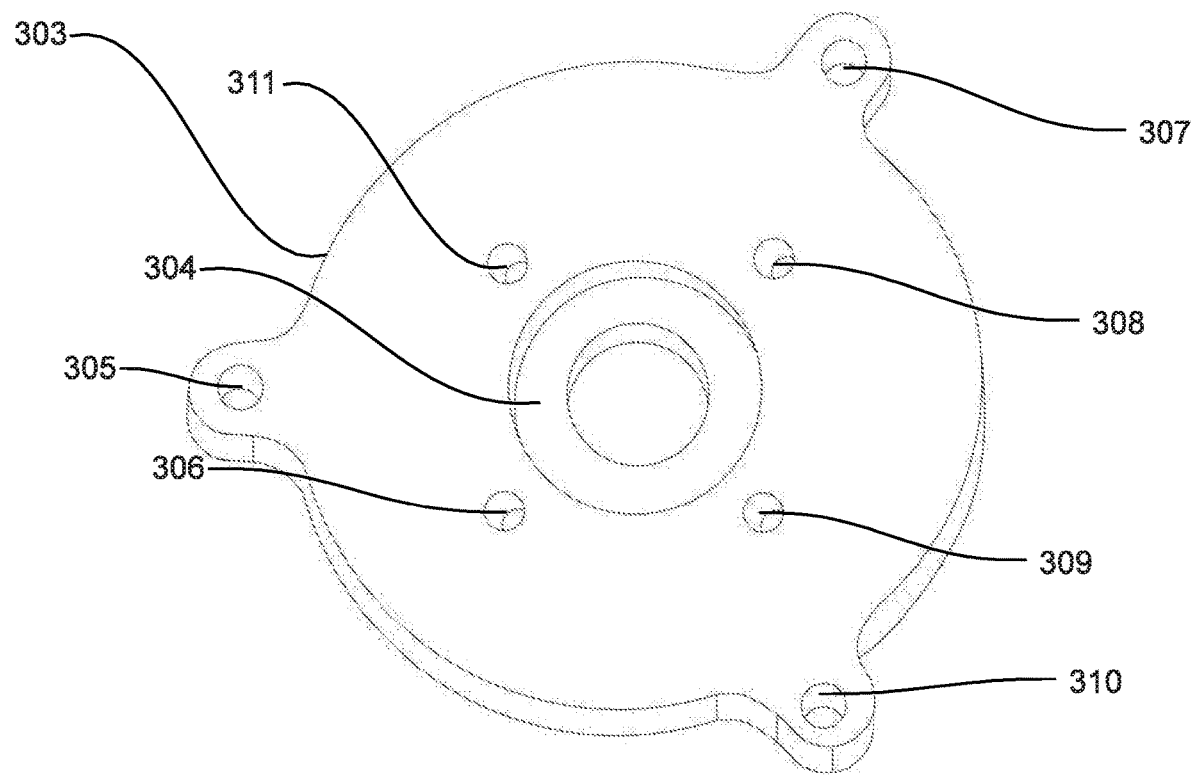
FIG. 3C is a perspective view of an exemplary discrete object produced from the additively manufactured body of material depicted in FIG. 3B.

FIG. 3C is a perspective view of an exemplary embodiment of a discrete object 303 formed by subtractive manufacturing from additively manufactured body of material. Discrete object 303 may have features 304-311 formed by subtractive manufacturing that were absent from additively manufactured body of material, such as one or more holes, which may be through-holes or blind holes. Discrete object 303 may have modified features that were present in additively manufactured body of material 300; for instance, surfaces of discrete object may have been flattened or shaped to allow a tolerance fit, for instance a press-fit for a bearing. Discrete object 303 may have any form as dictated by machine control instructions and additive manufacturing steps.

Figure 4:
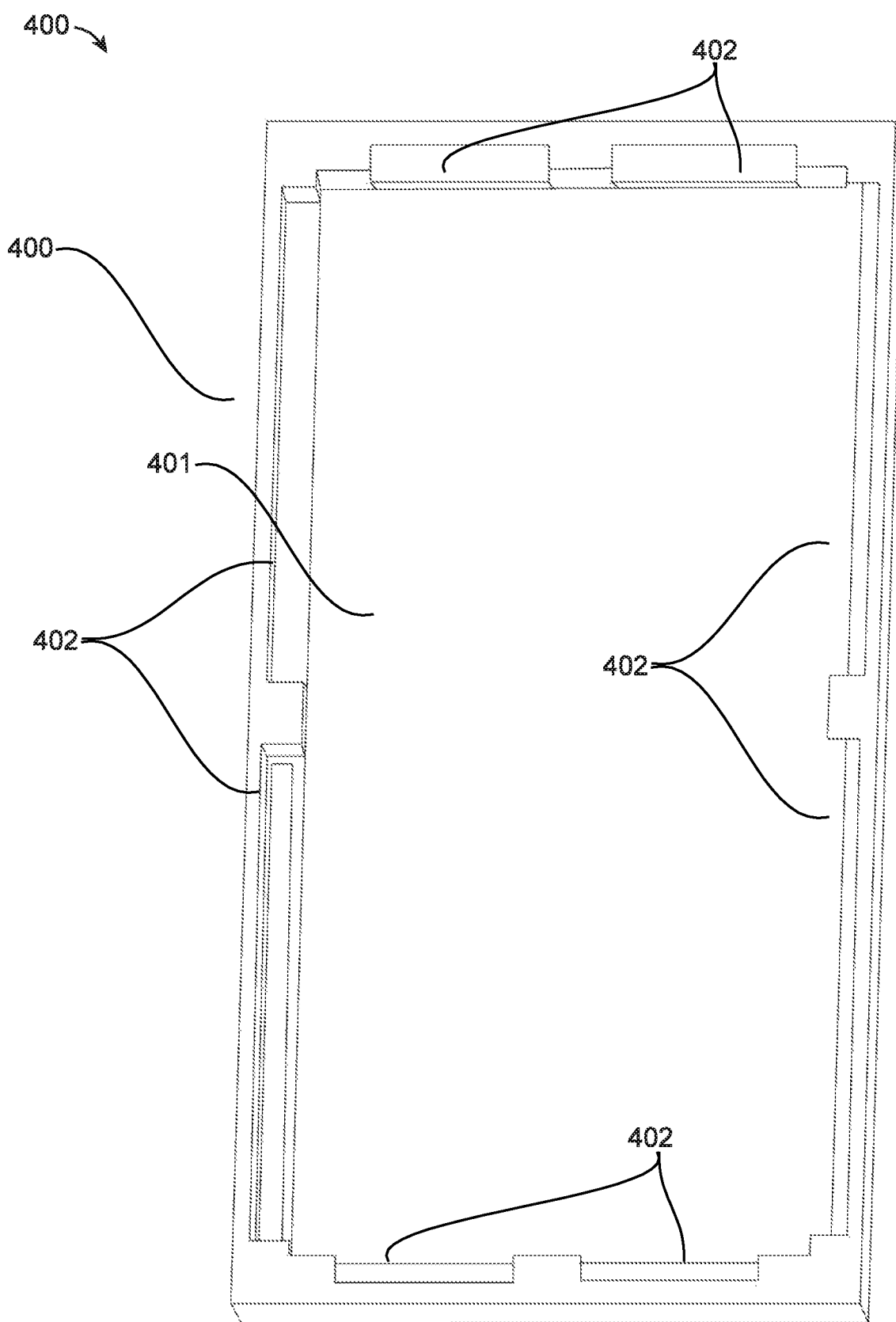
FIG. 4 is a perspective view of an exemplary frame.

FIG. 4 illustrates an embodiment of frame 400. Frame 400 is rectangular in the illustrated example, but may have any desired shape. Frame 400 includes at least an opening 401; in the illustrated embodiment, at least an opening is shown as a single rectangular opening for the sake of simplicity. However, in general at least an opening 401 may include multiple openings of varied shapes. Frame 400 may include at least a feature 402 designed and configured to receive removable fixating material and thereby form a mechanical interlock between the frame and the additively manufactured body of material. At least a feature 402 may be a recess in a surface of frame 400; recess may have an interior that communicates with at least an opening 401 so that removable fixating material installed in at least an opening 401 also enters recess. Recesses are shown in the illustrated example as rectangular in form, but in general may have any shape or size of cross-sectional perimeter. At least a feature 402 may be located on a first side of frame 400 as well as a side of frame 400 other than the first side, such as a side opposite the first side, with the result that removable fixating material may interlock on two sides of the frame 400 and thus be securely held in the frame 400. Where frame 400 has a standardized perimeter, such as a rectangular perimeter 403, the standardized perimeter may function as a reference feature as described above.

Figure 5:
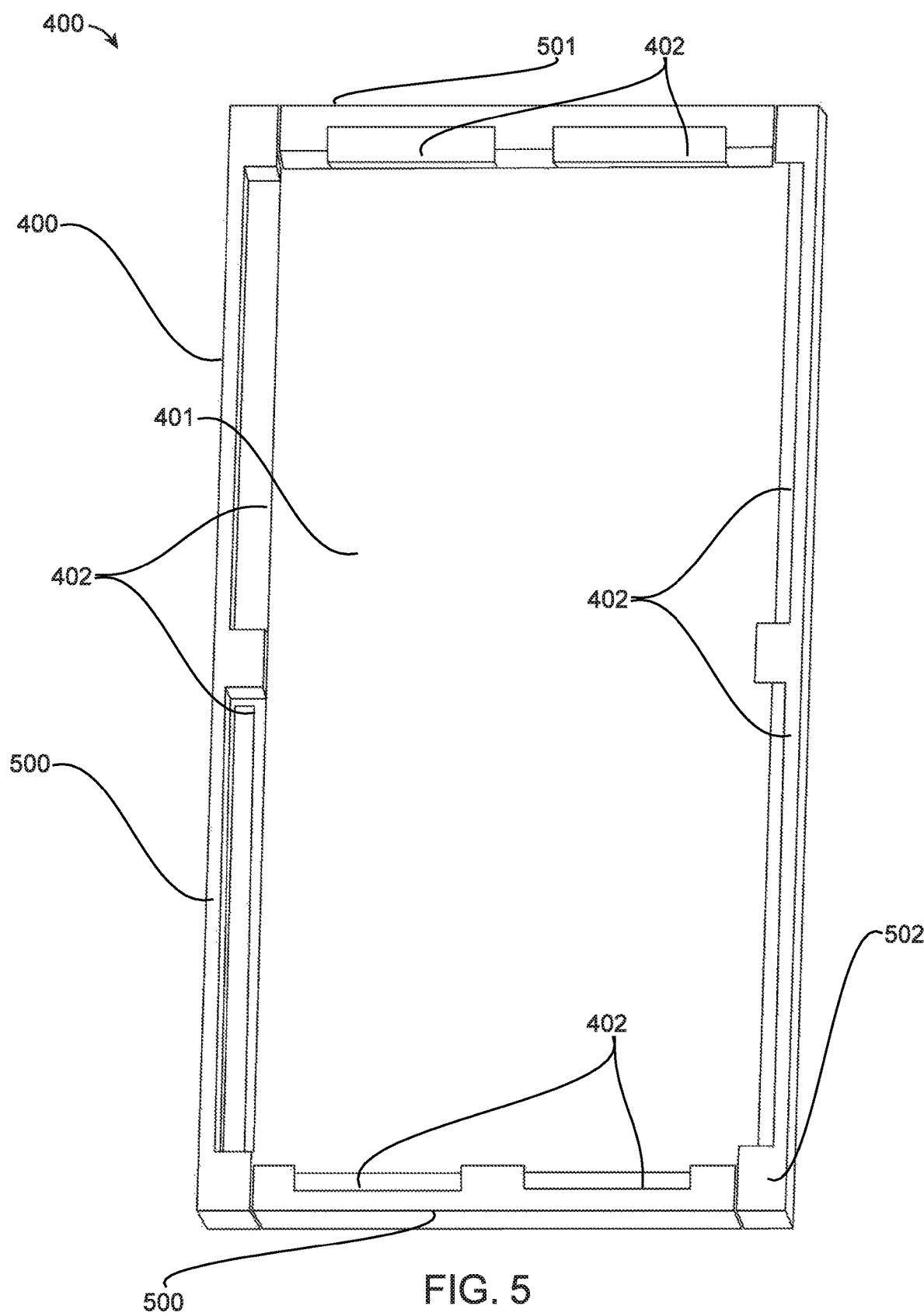
FIG. 5 is a perspective view of an exemplary frame assembled from a plurality of sections.

FIG. 5 illustrates an embodiment in which frame 400 is assembled from a plurality of sections; in the illustrated example, frame 400 is made up of two sections 500 and 501 that combine to form a substantially rectangular frame with a substantially rectangular opening 401; as illustrated for example here, sections may include a first section 500 having a surface which makes up a first fractional portion of interior surface of at least an opening 401 and a second section 501 having a surface that makes up a second fractional portion of interior surface of at least an opening 401, the first section 500 and second section 501 able to be joined to form the complete interior surface, as shown. In general a greater number of sections may be assembled to make up frame 400; for instance, four sections 500-403 making up four sides of the at least an opening may be combined, to form frame. Persons skilled in the art, upon reading the entirety of this disclosure, will be aware that frame 400 may be assembled from greater or lesser numbers of sections; for instance, an embodiment of frame 400 having multiple openings, such as that illustrated and described below, may be divided into sections in a number of ways to achieve various objects. As a further example, a plurality of sections may be combined in an adjustable manner to modify a size and shape of at least an opening as described above. One section of the plurality of sections assembled to make up frame may be a base element as described in further detail below. As a further non-limiting example, frame 400 may be made up of flat or curved metal pieces clamped together to form at least an opening, with or without the inclusion of a feature 402. As an additional example, base element may have one or more prepositioned grooves or other surface features to accept flat or curved metal pieces that define at least an opening when inserted in the one or more prepositioned grooves.

Figure 6A:
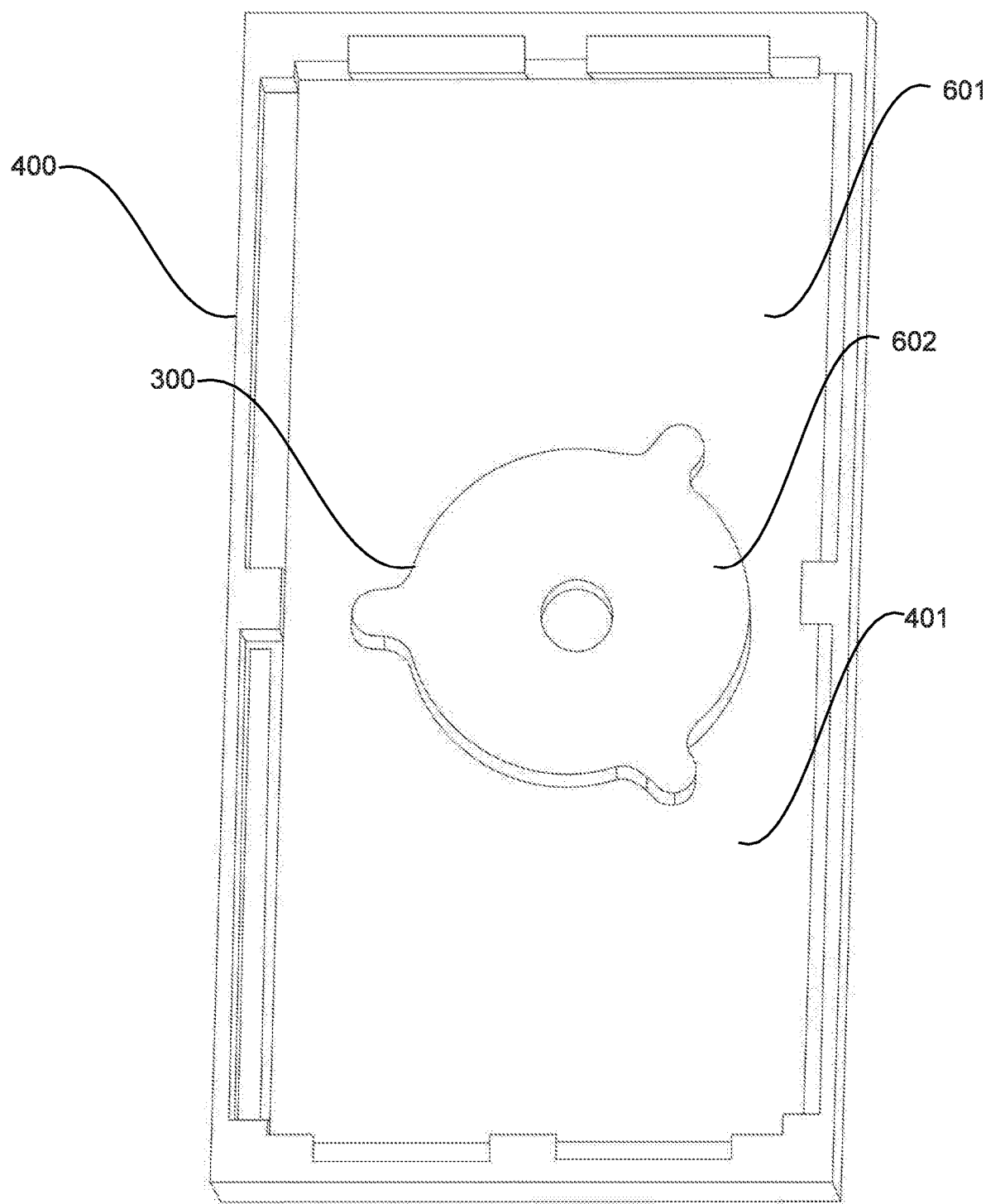
FIG. 6A is a perspective view of an exemplary frame with an additively manufactured body of material inserted in its opening.
Figure 6B:
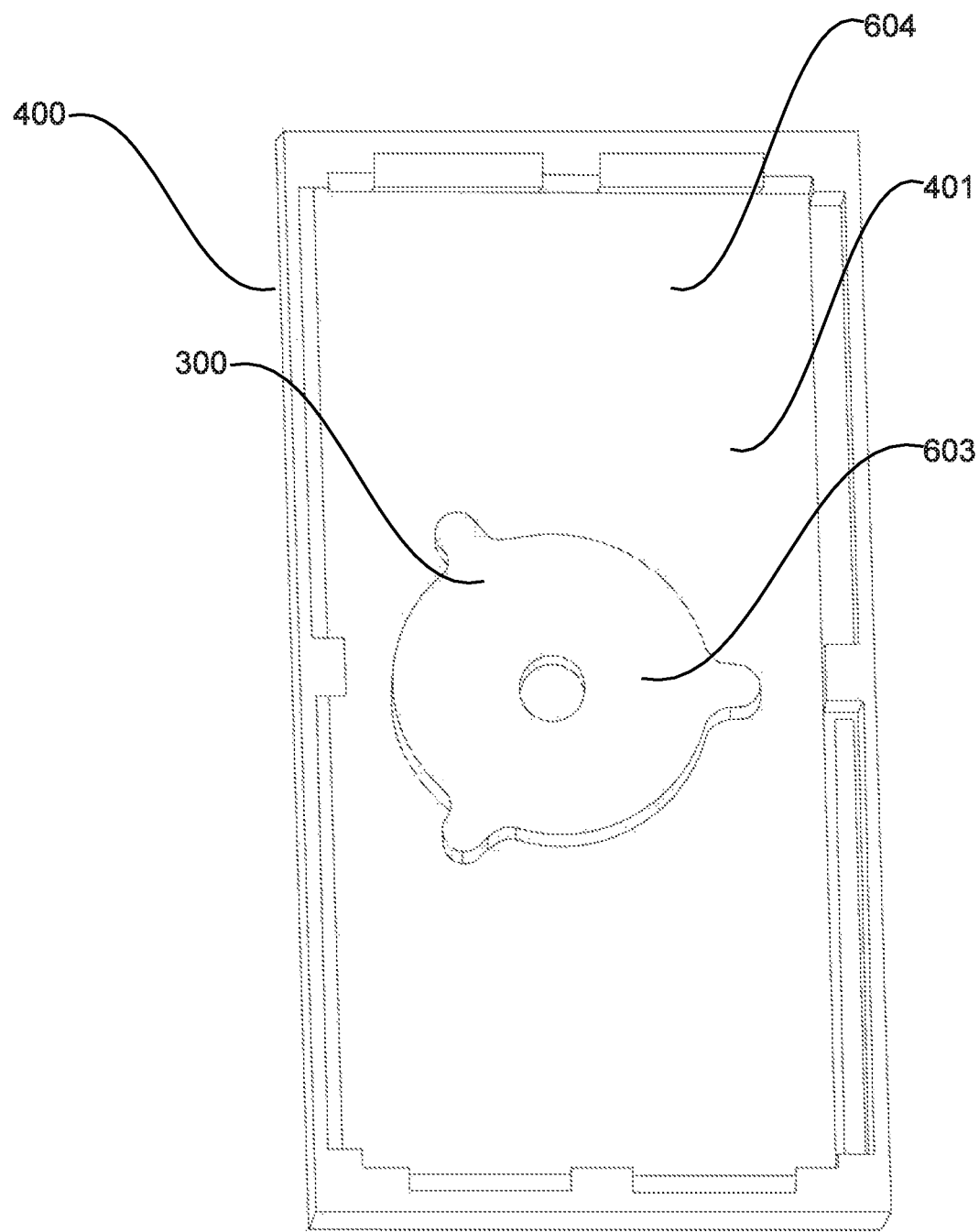
FIG. 6B is a perspective view of an exemplary frame with an additively manufactured body of material inserted in its opening.

FIGS. 6A-B illustrates an example of additively manufactured body of material 300 placed in at least an opening 401. As noted above, additively manufactured body of material 300 may be placed in at least an opening 401 by precisely locating the additively manufactured body of material 300 in the at least an opening 401 using physical measurement devices; alternatively, additively manufactured body of material 300 may be additively manufactured within at least an opening after frame 400 has been located within a coordinate system used to additively manufacture additively manufactured body of material 300. Furthermore, frame 400 and additively manufactured body of material 300 may be manufactured together; thus, frame alone as depicted in FIG. 4 and additively manufactured body of material 300 outside of frame as depicted in FIGS. 3A-B may not exist in a particular embodiment of the method 100. Furthermore, there may be one or more connective pieces (not shown) connecting frame 400 to additively manufactured body of material 300; one or more connective pieces may be additively manufactured, for instance, one or more connective features may be additively manufactured with additively manufactured body of material 300 and on frame 400, so that frame 400 and additively manufactured body of material 300 are effectively fused together into a monolithic unit. In an embodiment, one or more connective features manufactured on additively manufactured body of material may rest, attach to or set into one or more features of frame, such as recesses into which one or more connective features may be inserted.

Where at least an opening is a through-opening, additively manufactured body of material 300 may be accessed from two sides of at least an opening 401 and frame 400; for instance, FIG. 6A illustrates a first side 600 of additively manufactured body of material 300 in a first side 601 of at least an opening 401. FIG. 6B illustrates a second side 603 of additively manufactured body of material 300 in a second side 604 of at least an opening 401, which may be accessible, for instance, by flipping frame 400 and stabilized workpiece over together as described as above.

Figure 7:
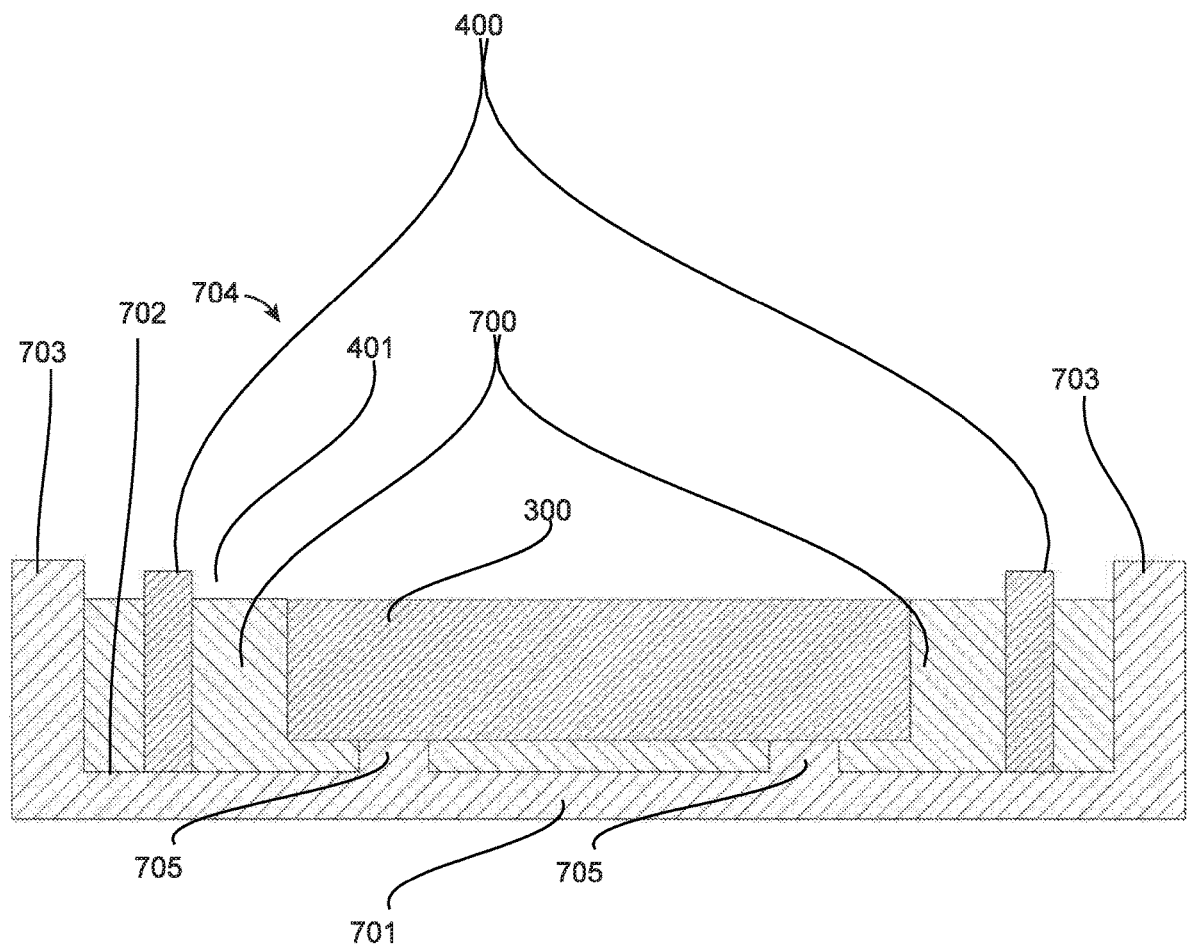
FIG. 7 is a cross-sectional view of an exemplary frame and additively manufactured body of material placed in a tray with removable fixating material added.

FIG. 7 illustrates an exemplary scenario for installation of removable fixating material 700 in which at least an opening 401 is a through-opening. Frame 400 is shown here in cross-section, with additively manufactured body of material 300, also shown in cross-section, placed in at least an opening 401. Frame 400 and additively manufactured body of material 300 together are placed in a tray 701; tray 701 may include a work surface 702 on which frame 400 and additively manufactured body of material 300 rest. Tray 701 may include a lip 703, or vertical side-wall, which may encircle the work surface 702 and prevent removable fixating material 700 from spilling out. Inner periphery of lip 703 may be formed to fit snugly to outer periphery of frame 400; here frame 400 has a standardized or predictable outer periphery shape size, and tray may similarly have a standardized or predictable shape. Where tray 701 is purchased or otherwise obtained from a third party, frame 400 may have a standard shape and size to fit snugly in tray 701. Tray 701 may be used only once, or may be reused multiple times. Tray may be additively or subtractively manufactured in a similar manner to frame 400 or additively manufactured body of material 300. In an embodiment, tray 701 includes one or more support features 705 that support additively manufactured body of material 300 in tray 701. One or more support features 705 may have any suitable form to support additively manufactured body of material 300; for instance, one or more support features 705 may be dowel pins standing up from work surface 702. Support features 705 may have sizes and shapes that vary according to the shape and dimensions of additively manufactured body of material 300. For instance, where additively manufactured body of material 300 has an underside that is not a substantially flat plane, support features 705 may have varying lengths to support the underside at varying heights above work surface 702; this may ensure that additively manufactured body of material 300 is maintained at an orientation expected when designing toolpaths for the subtractive manufacturing device to follow in forming discrete object. Support features 705 may be additively manufactured as part of tray 701. In an embodiment, support features 705 are additively manufactured as part of additively manufactured body of material 300. Support features 705 may be manufactured to fit particular surface features or reference features of additively manufactured body of material 300, so that placing additively manufactured body of material 300 on support features 705 precisely locates additively manufactured body of material on work surface 702; this may also precisely located additively manufactured body within at least an opening 401, where frame 400 is also precisely located in tray, for instance using one or more reference features of frame 400.

Removable fixating material 700 may be poured into tray 701 after frame 400 and additively manufactured body 300 have been placed in tray. Additively manufactured body of material 300, frame 400, or both may be clamped or otherwise secured to tray 701 during this process to maintain relative placement for the purpose of location. Removable fixating material 700 may partially or fully fill tray 701 both within and without at least an opening 401. After removeable fixating material 700 solidifies, stabilized workpiece 704 made up of additively manufactured body 300, frame 400, and removable fixating material 700 may be removed from tray 701; alternatively, tray 701 may remain attached to stabilized workpiece 704 during step 130. In the latter case, tray 701 may be partially or wholly removed by subtractive manufacturing processes. Where tray 701 is removed from stabilized workpiece 704, removable fixating material 700 outside of at least an opening 401 may be removed; in an embodiment, this enables frame 400 to be precisely located at subtractive manufacturing device using one or more reference features. Where tray 701 includes support features 705 removable fixating material 700 may flow under additively manufactured body of material 300 and around support features 705 when poured into tray 701.

Figure 8:
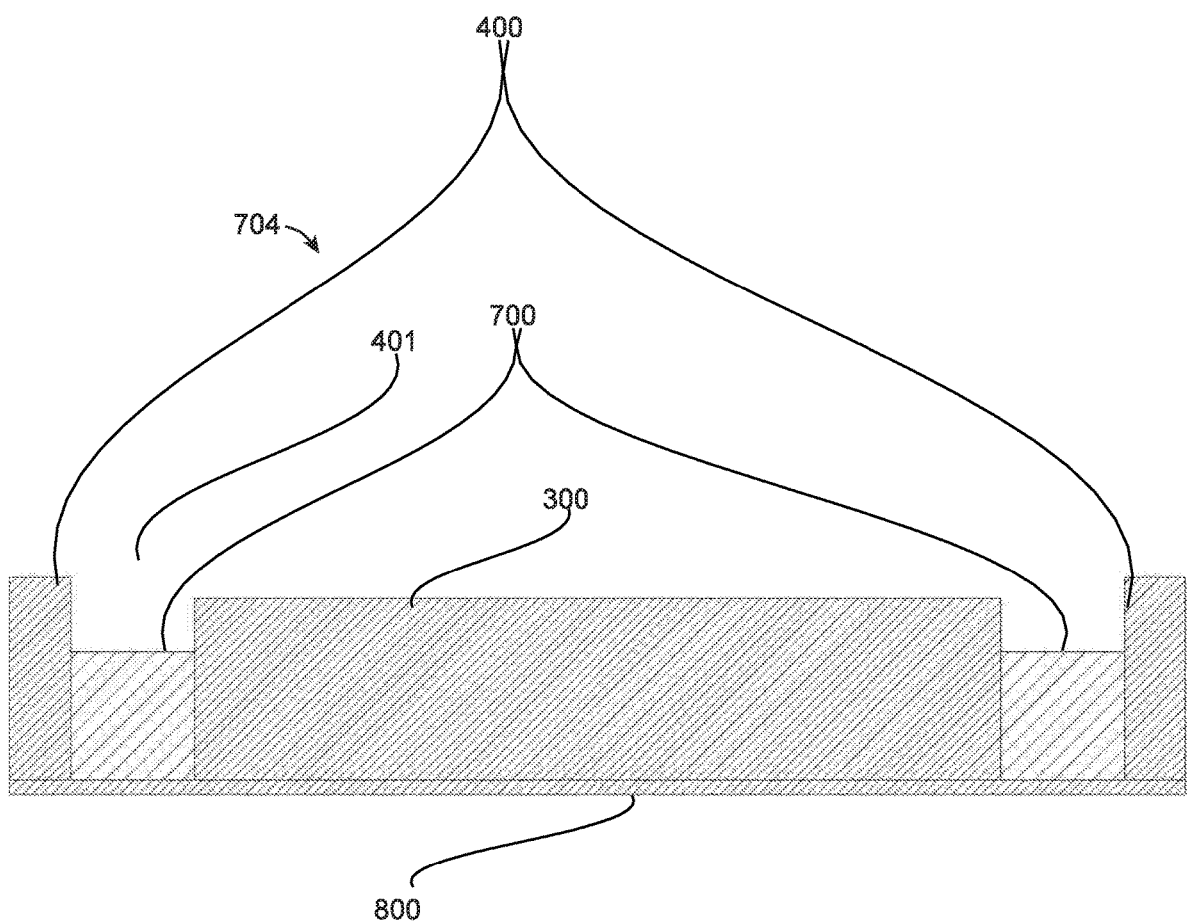
FIG. 8 is a cross-sectional view of an exemplary frame with a removable base and additively manufactured body of material, with removable fixating material added.

FIG. 8 illustrates an exemplary scenario where frame 400 includes a removable base portion 700, which may be one of several sections making up frame 400 as described above. Removable base portion 700 may be attached to the remainder of frame 400 using fasteners, clamped to the remainder of frame 400, or otherwise attached to frame. In an embodiment, removable base portion 700 is attached sufficiently tightly to frame 400 to prevent all or substantially all leakage of removable fixating material from the joint between remainder of frame 400 and removable base portion 700. As a non-limiting example removeable base portion 700 may be made using a sheet of $\frac{1}{8}^{th}$ inch metal.

In an embodiment, remainder of frame 400 is placed on removable base portion 700 and fastened or clamped to removable base portion 700. In an embodiment, removable base portion 700 is placed and not attached to frame 400; frame 400 may rest on removable base. Additively manufactured body of material 300 may be rested on removable base portion 700 either before or after remainder of frame 400 is placed on removable base portion 700; additively manufactured body of material 300 may be clamped or otherwise secured to removable base portion 700 or to frame. Removable fixating material 700 is installed in at least an opening 401. After removeable fixating material 700 hardens enough to make a stabilized workpiece 704, removable base portion 700 may be removed prior to step 130 subtractive manufacturing; alternatively, removable base portion 700 may remain a part of stabilized workpiece 704. Whether placed or attached, removable base may have features (not shown) which create an interlock with fixating material 700 once fixating material 700 has hardened; features may be implemented similarly to features of frame 400 as described above.

Figure 9:
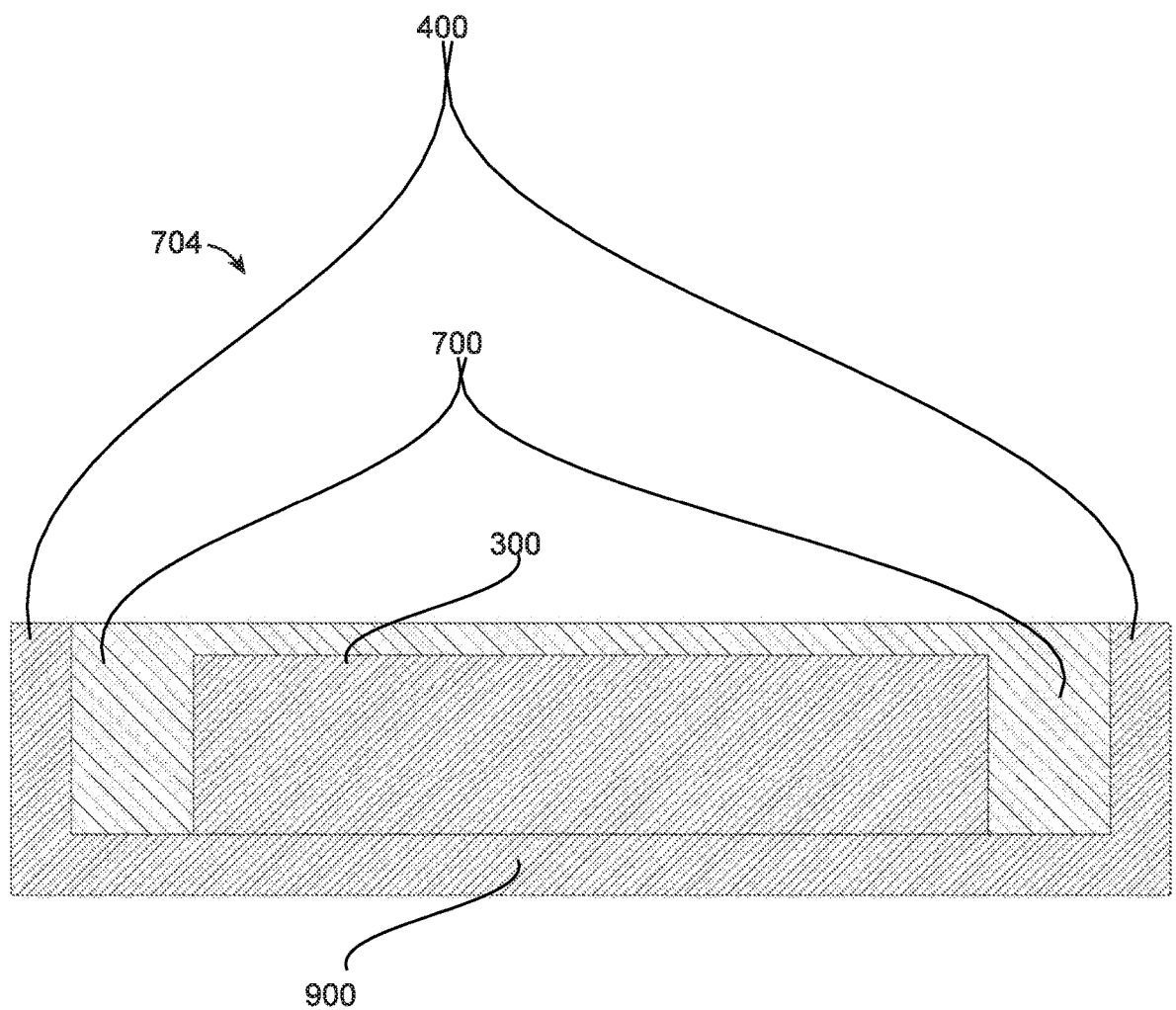
FIG. 9 is a cross-sectional view of an exemplary frame with an integral base and additively manufactured body of material, with removable fixating material added.

FIG. 9 illustrates an exemplary scenario in which frame 400 has an integral base portion 800. When additively manufactured body of material 300 is placed in frame 400, removable fixative material 700 may be added in at least an opening 401; additively manufactured body of material 300 may be clamped or otherwise securely fastened to integral base portion 800 while removable fixative material is added, to maintain the position of additively manufactured body 300 relative to frame 400. In an embodiment, additively manufactured body of material 300 is not secured to frame 400. Alternatively, additively manufactured body of material may be placed upon or attached to supports which are placed upon or attached to frame 400. In an embodiment, as shown in FIG. 9, removable fixating material 700 covers additively manufactured body of material 300 completely; for instance, where frame 400 projects above additively manufactured body of material 300, removable fixating material 700 may be added until it fills the frame up, covering over the additively manufactured body of material 300. In an embodiment, the top of additively manufactured body of material 300 is machined through removable fixating material 700; in other words, removable fixating material 700 is removed to the extent necessary to reach any feature of additively manufactured body of material 300 that is being subjected to subtractive manufacturing. If stabilized workpiece 704 is flipped to perform subtractive manufacturing on the other side, removable fixating material 700 that has not been machined away may be flush with frame 400 or, if stabilized workpiece 704 was removed from frame, may present a flat surface which may rest on a support surface of subtractive manufacturing device, allowing for accurate subtractive manufacturing of stabilized workpiece.

Figure 10:
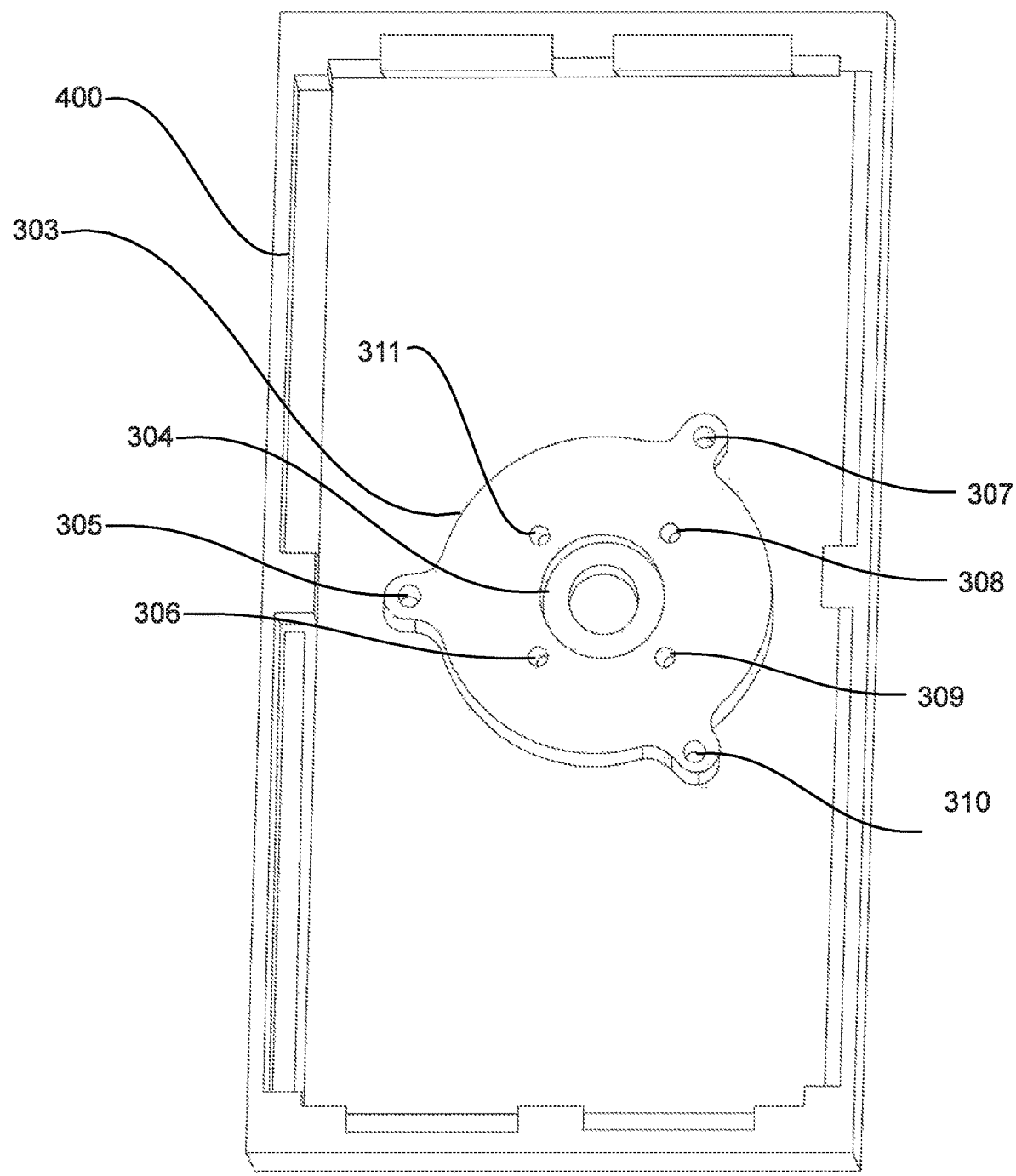
FIG. 10 is a perspective view of an exemplary embodiment of a frame with a discrete object formed by subtractive manufacturing from an additively manufactured body of material.

FIG. 10 illustrates an exemplary embodiment of frame 400 with discrete object 303 after the formation of discrete object 303 by subtractive manufacturing at step 130 and removal of removable fixative material at step 135. Discrete object 303 may subsequently removed from frame 400 and subjected to further manufacturing steps as described above.

FIG. 11 illustrates an exemplary embodiment of method 1000 of manufacturing a plurality of discrete objects from a body of material created by additive manufacturing. In general, all attributes for method 100 as described above are applicable to method 1000. In optional step 1105, an additively manufactured body of material is additively manufactured; this may be performed as described above for step 105 of method 100. At step 1110, additively manufactured body is received. Receiving additively manufactured body may be accomplished as described above for step 110 of method 100. For both step 1105 and step 1110, additively manufactured body of material may contain precursors to a plurality of discrete objects. At step 1115, a frame having at least an opening is received; this may be implemented as described above for step 115 of method 100, including without limitation by modeling additively manufactured body of material using one or more graphical or computer models, and/or by generating additive manufacturing instructions from such graphical or computer models. Frame may be manufactured through additive or subtractive manufacturing, received from a third party, or reused from a previous method, among other possibilities.

Method 1000 includes placing the additively manufactured body of material within the opening of the frame (1120); this may be performed as described above for step 120 of method 100. In an embodiment, a plurality of additively manufactured bodies of material are placed in at least an opening. For instance, a single opening of at least an opening may have two or more additively manufactured bodies of material placed in the single opening; In an embodiment, a first opening of at least an opening may have a first additively manufactured body of material placed in the first opening, and a second additively manufactured body of material may be inserted in a second opening of the at least an opening. As illustrated in greater detail below, there are multiple ways in which additively manufactured bodies may be inserted in at least an opening; persons skilled in the art, upon reading the entirety of this disclosure, will appreciate that there are many more ways in which multiple objects may be placed on one or more openings, and that this disclosure is not meant to be limited to the particular examples presented.

At step 1125, removable fixating material is installed around additively manufactured body of material and within at least an opening of frame, so that the removable fixating material and the additively manufactured body of material form a stabilized workpiece; this may be implemented as described above regarding step 125 of method 100. At step 130, a plurality of discrete objects is formed, by subtractive manufacturing, from the additively manufactured body of material. Plurality of discrete objects may be formed using any processes suitable for forming discrete object as described above for step 130 of method 100; in an embodiment, material between discrete objects is removed from additively manufactured body of material by subtractive manufacturing so that when removable fixating material is removed, plurality of discrete objects will be liberated from one another. Alternatively, material between discrete objects which connects them may be removed from additively manufactured body of material by subtractive manufacturing so that when removable fixating material is removed, the plurality of discrete objects will be liberated from one another. At step 1135 removable fixating material is removed; this may be implemented as described above for step 135 of method 100.

Step 1130 may include performing multiple positionings of stabilized workpiece at one or more secondary manufacturing devices; multiple positionings may be performed by using reference features of frame or additively manufactured body of material to located stabilized workpiece in a plurality of different positions within a coordinate system used by a secondary manufacturing device. For instance, frame may be positioned with a first side up for some machining steps, then flipped with that side down for subsequent steps; frame may also be turned about a vertical axis and repositioned using reference features. In an embodiment, subtractive manufacturing may create new features within stabilized workpiece which may be used as reference features for repositioning. A stabilized workpiece without a frame or with a partial frame may be similarly repositioned. Likewise, the multiple positionings may be arranged by performing multiple machine setups; i.e., an origin or other reference point of secondary manufacturing device may be placed at a first location on stabilized workpiece for a first set of secondary manufacturing steps and at a second location on stabilized workpiece for a second set of manufacturing steps, and at further locations as desired for additional steps. Alternatively, multiple positionings may occur on multiple subtractive manufacturing machines. One or more subtractive steps may be performed automatedly; method 1100 may include generation of one or more machine-control instructions to perform the one or more subtractive steps as described above in reference to FIG. 1.

In FIG. 12, an exemplary embodiment of a method 1200 of manufacturing a plurality of discrete objects from a body of material created by additive manufacturing is illustrated. At step 1205, an additively manufactured body of material including a plurality of interconnected structures is received. Each of the plurality of structures may have any form suitable for use as a body of material 300 as described above; for instance, each of the plurality of structures may have any rectangular, polygonal or curved cross-sectional perimeter, or any combination of polygonal and curved forms. Each of the plurality of structures may share a geometric characteristic of a discrete object to be formed from the structure, as described above in reference to FIG. 1; a structure may represent a "near net" discrete object to be formed from the structure. Plurality of interconnected structures may be precursors for plurality of discrete objects; that is, a structure of plurality of interconnected structures may be a precursor for a discrete object of plurality of discrete objects, and In an embodiment, each structure of plurality of interconnected structures is a precursor for a discrete object of plurality of discrete objects. In an embodiment, additively manufactured body of material includes plurality of structures and a plurality of interconnecting portions that interconnect the structures, resulting in a plurality of interconnected structures. In an embodiment, receiving additively manufactured body of material further includes manufacturing the additively manufactured body of material. In an embodiment, this is implemented as described above for step 105 of method 100; for instance, additively manufactured body of material may be any additively manufactured body of material as described above in reference to FIGS. 3A-9. In an embodiment, additively manufactured body of material is manufactured by receiving a plurality of structures and additively manufacturing one or more interconnecting portions to form the additively manufactured body.

Interconnecting portions may be formed using any additive manufacturing process described above. Interconnecting portions may be bridging forms that connect each structure to at least one other structure; bridging forms may be elongated sprues or strips. Bridging forms may have minimal thicknesses necessary to hold together structures during the remainder of the method. In an embodiment, bridging forms have a uniform thickness to aid in later removal as described in further detail below. In an embodiment, receiving plurality of structures further includes additively manufacturing at least one of the plurality of structures. At least one structure may be additively manufactured as described in above for additively manufacturing additively manufactured body of material for step 105. In an embodiment, at least one structure of plurality of structures is received from a third party or reused. Interconnecting portions and plurality of structures may be formed together in the same additive manufacturing process.

In an embodiment, forming interconnecting portions by additive manufacturing may further include modeling interconnecting portions in a graphical or computer model. For instance, and without limitation, each structure of plurality of structures may have a corresponding computer or graphical model; similarly each discrete object of plurality of discrete objects may have a corresponding computer or graphical model. Computer or graphical models may be received from another machine, designed by a user by way of a CAD program or other modeling program, or the like. Interrogation as described above may identify one or more features to form in each precursor and/or discrete object computer model; similarly, an orientation for each precursor and/or structure in additively manufactured body of material may be selected using identified feature to form. Alternatively or additionally, a user may identify an orientation for each precursor and/or structure in additively manufactured body of material. Each computer model of a precursor may be located within a location in at least an opening of a graphical representation and/or computer model of frame; location may be performed by a user or automatedly. In an embodiment, an automated manufacturing device, controller, and/or computing device generates a computer model of one or more interconnecting structures or bridging structures. This may be performed as described in further detail below.

At step 1210, a frame having at least an opening is received. This may be implemented as described above for step 115 of method 100. For instance, receiving frame may include assembling the frame from a plurality of sections. Receiving frame may involve additively manufacturing the frame. Receiving frame may involve subtractively manufacturing the frame. Frame may have any feature or property described above for a frame in reference to FIGS. 1-9; for example, at least an opening may be a through-opening or a blind opening. Frame may include at least a feature designed and configured to receive removable fixating material and thereby form a mechanical interlock between the frame and an additively manufactured body of material. Frame may include at least a reference feature designed, configured, and located for precisely locating the frame relative to a subtractive manufacturing machine. In an embodiment, at least a portion of frame is a part of additively manufactured body of material; this may be implemented as described above in reference to step 115 of method 100. At least a portion of frame may be a structure of plurality of structures. Frame or a portion of frame as a structure within additively manufactured body of material may have at least an opening in which a plurality of structures, which may be discrete object precursors, have been additively manufactured.

At step 1215, additively manufactured body of material is placed within at least an opening of frame. This may be performed according to any process described above regarding step 120 of method 100. For instance, placing may involve locating additively manufactured body of material in a precise position relative to frame, using any approach described above. In an embodiment, a first of plurality of interconnected structures in additively manufactured body of material is placed in a first opening of at least an opening and a second of the plurality of interconnected structures in the additively manufactured body of material is placed in a second opening of the at least an opening; a bridging structure linking first structure and second structure may pass over a barrier between first opening and second opening. In an embodiment, a plurality of additively manufactured bodies of material are placed in at least an opening as described above in reference to FIG. 11.

At step 1220, removable fixating material is installed around additively manufactured body of material and within at least an opening of frame, so that the removable fixing material and the additively manufactured body of material form a stabilized workpiece. This may be accomplished as described above for step 125 of method 100. If multiple openings exist within a frame, removable fixating material may be installed around at least one, some or many of the additively manufactured body of materials and within the openings of the frame, so that the removable fixing material and the additively manufactured body of material form a stabilized workpiece in at least one of the openings.

Step 1225 includes forming, by subtractive manufacturing, plurality of discrete objects from additively manufactured body of material. In an embodiment this is implemented as described above for step 1130 of method 1000. Subtractive manufacturing may be any form of subtractive manufacturing, including milling. Some embodiments of method 1200 further removing a portion of frame using subtractive manufacturing. Other embodiments include the optional step 1230 of removing, by subtractive manufacturing, one or more interconnecting portions of additively manufactured body of material. Removing these interconnecting portions results in the objects, and frame if present, becoming discrete structures held together by only the removable fixating material. An efficient example of performing step 1230 is present when one side (reverse side) of additively manufactured body of material must be processed to remove a uniform thickness across that entire side in the region of discrete objects. Such a situation might occur, for example, when one or more faces of discrete objects are located at a minimum depth from the raw face of additively manufactured body of material on that side. In this case, the thickness of interconnecting may be made to be equal to or less than that minimum depth. Then, continuing the example, to remove interconnecting portions and perhaps also at least partially finish each of discrete objects, one subtractive manufacturing operation may be to remove a uniformly thick region of material from entire reverse side of stabilized workpiece that removes the interconnecting portions and material from each of precursors to discrete objects as a step toward finishing each of the discrete objects.

Step 1225 may include performing multiple positionings of stabilized workpiece at one or more secondary manufacturing devices; multiple positionings may be performed with a single machine setup by using reference features of frame or additively manufactured body of material to located stabilized workpiece in a plurality of different positions within a coordinate system used by a secondary manufacturing device. For instance, frame may be positioned with a first side up for some machining steps, then flipped with that side down for subsequent steps; frame may also be positioned about a vertical axis and repositioned using reference features. A stabilized workpiece without a frame or with a partial frame may be similarly repositioned. Likewise, multiple positionings may be arranged by performing multiple machine setups; i.e., an origin or other reference point of secondary manufacturing device may be placed at a first location on stabilized workpiece for a first set of secondary manufacturing steps and at a second location on stabilized workpiece for a second set of manufacturing steps, and at further locations as desired for additional steps.

By removing interconnecting portions where present, discrete objects may become discrete structures held together only by removable fixating material. It is noted that uniform-thickness material removal from the reverse side of stabilized workpiece is only an example. Interconnecting portions can be removed in any suitable or desired manner. For example, interconnecting portions may be removed from the reverse side without removing any material of structures located over any of discrete objects. As another example, if some but not all of discrete objects require material removal from the reverse side, that material may be removed along with removal of interconnecting portions. Fundamentally, there is no limitation on the manner in which subtractive manufacturing is used to remove bridging to form discrete objects. For instance, interconnecting portions may be removed from a top side of stabilized workpiece, from a bottom side of the stabilized workpiece, or both; considerations including geometry considerations and/or considerations concerning the design of subtractive manufacturing device may determine how the interconnecting structures are removed. In an embodiment removable fixating material maintains stability of stabilized workpiece during and after removable of interconnecting portions; thus, for instance, stabilized workpiece may remain stable after interconnecting portions are removed, so that further subtractive manufacturing may be performed on stabilized workpiece.

At step 1235, removable fixating material is removed. This may be accomplished as described above in reference to step 135 of method 100. Where frame includes a plurality of sections, the frame may be disassembled. Each of plurality of discrete objects may be subjected to further processing as described above in reference to FIG. 1. Each step of method 1200 may be automated or performed by workers as described above in reference to FIG. 1.

FIGS. 12-16 illustrate several examples of various steps of method 1200 of FIG. 12. It is noted that throughout FIGS. 12-16, each and every occurrence of elements such as certain spaces, features, structures, discrete objects, and interconnecting portions are not labeled for convenience and to avoid cluttering the figures. However, at least some are labeled, and those skilled in the art will readily understand where these elements exist though they are unlabeled.

Figure 13:
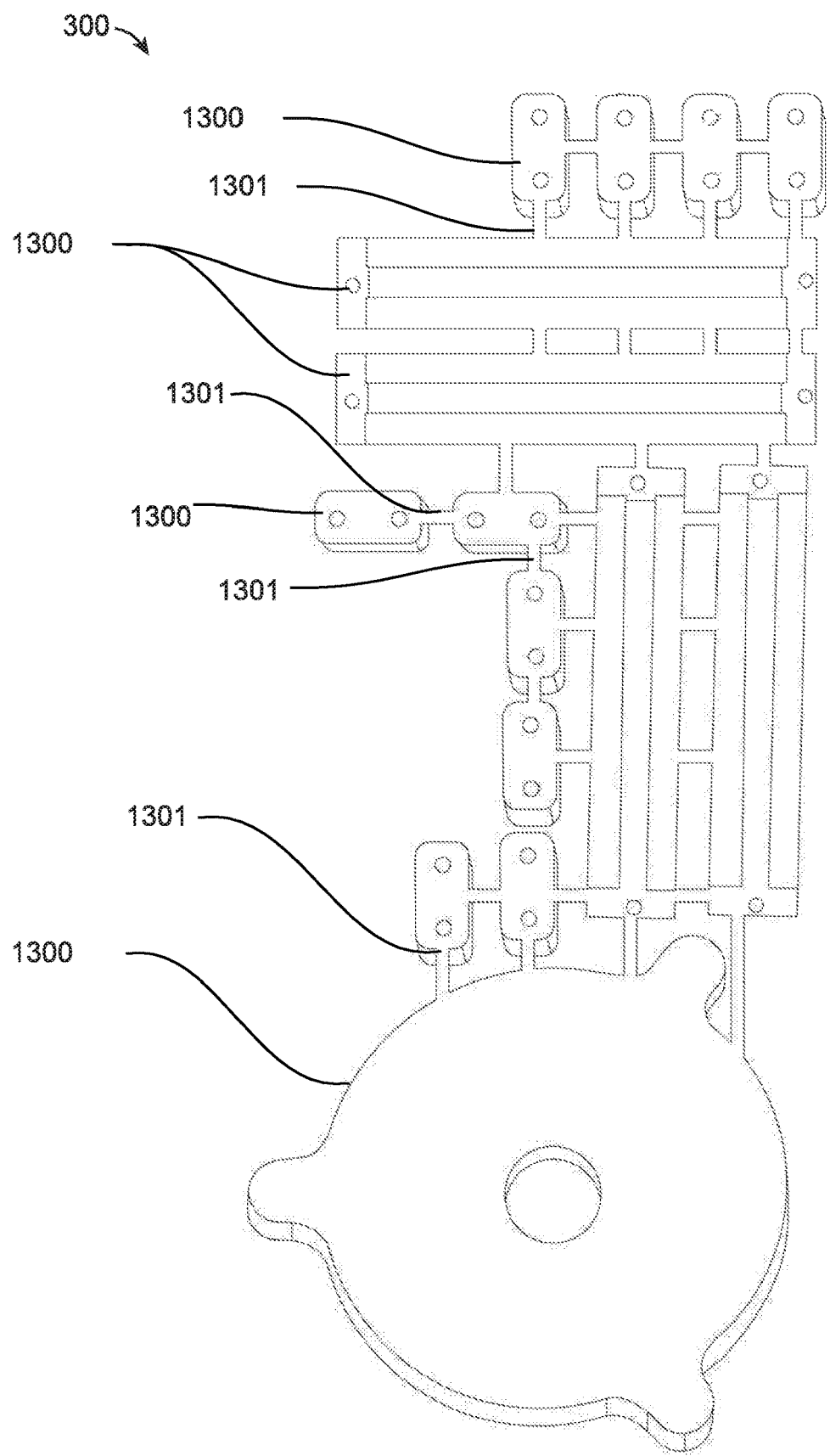
FIG. 13 is a perspective view illustrating an exemplary additively manufactured body of material.

FIG. 13 illustrates an exemplary embodiment of an additively manufactured body of material 300 including a plurality of interconnected structures 1300. In the illustrated example, each of interconnected structures 1300 is connected to at least one other structure by one or more interconnecting portions 1301. For the sake of legibility, not all structures or interconnecting portions are labeled in FIG. 13. One or more interconnecting portions 1301 are shown in the illustrated example as strips of material; in general, one or more interconnecting portions 1301 may have any suitable form. In an embodiment, one or more interconnecting portions may have a minimum width necessary to hold together additively manufactured body of material 300 during method 1200; for instance, one or more interconnecting portions may be created with just sufficient material to ensure that plurality of structures 1300 retain positions in which they are placed within at least an opening in frame until removable fixating material can be installed. As illustrated, any two structures may be connected by a single interconnecting portion or by a plurality of interconnecting portions. In an embodiment, each structure of plurality of interconnected structures 1300 as illustrated has at least a geometric characteristic of discrete object to be formed from the structure; each structure may represent a near-net discrete object, requiring subtractive manufacturing to complete manufacture to a needed tolerance, to tap a hole or holes to produce a thread or threads, to create a desired surface finish, flatness, finishing to a tolerance, to add other details or to bring any of the above to a partial completeness which additional manufacturing operations may complete.

Figure 14:
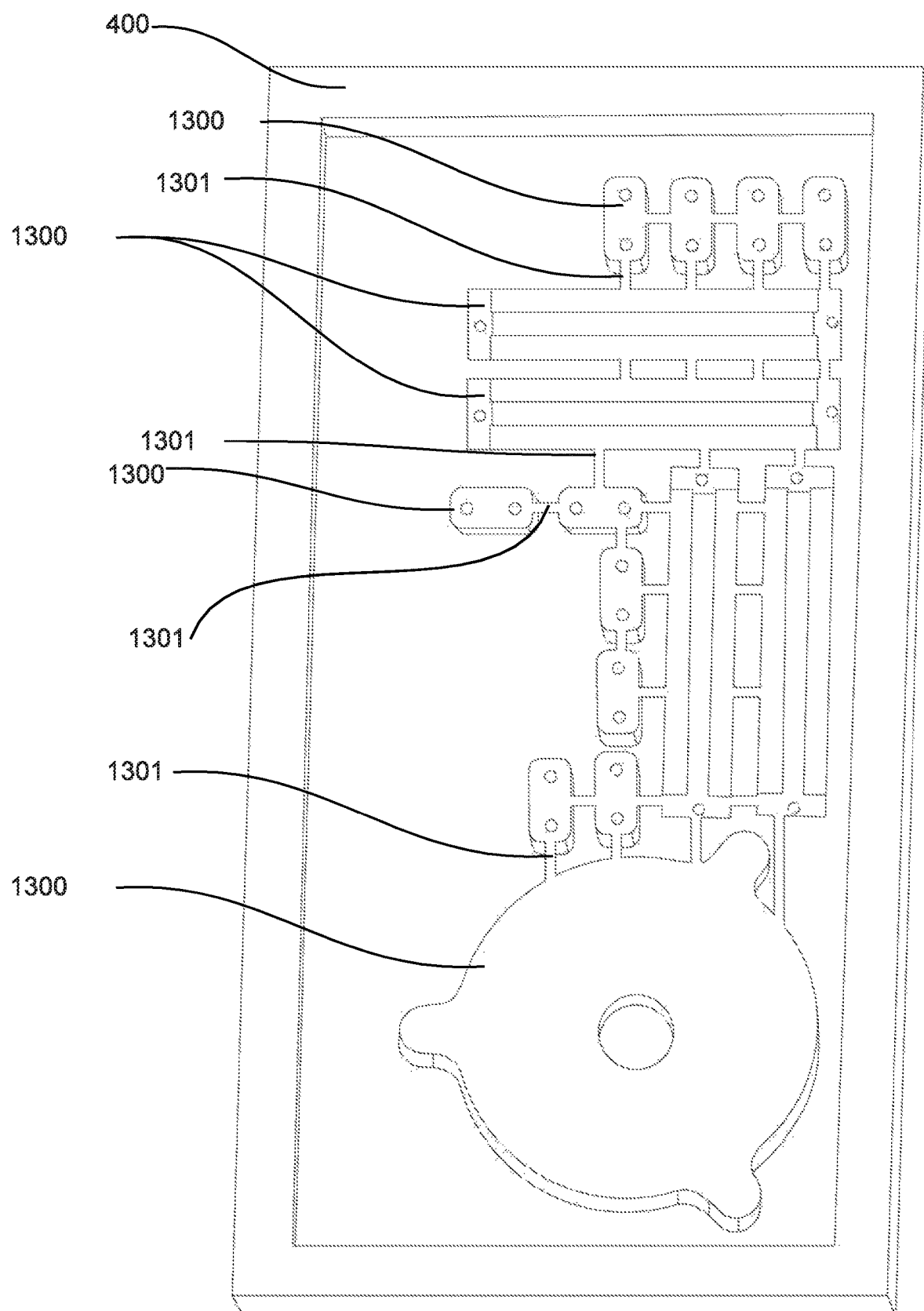
FIG. 14 is a perspective view illustrating an exemplary embodiment of a frame with an additively manufactured body of material inserted in its opening.
Figure 15:
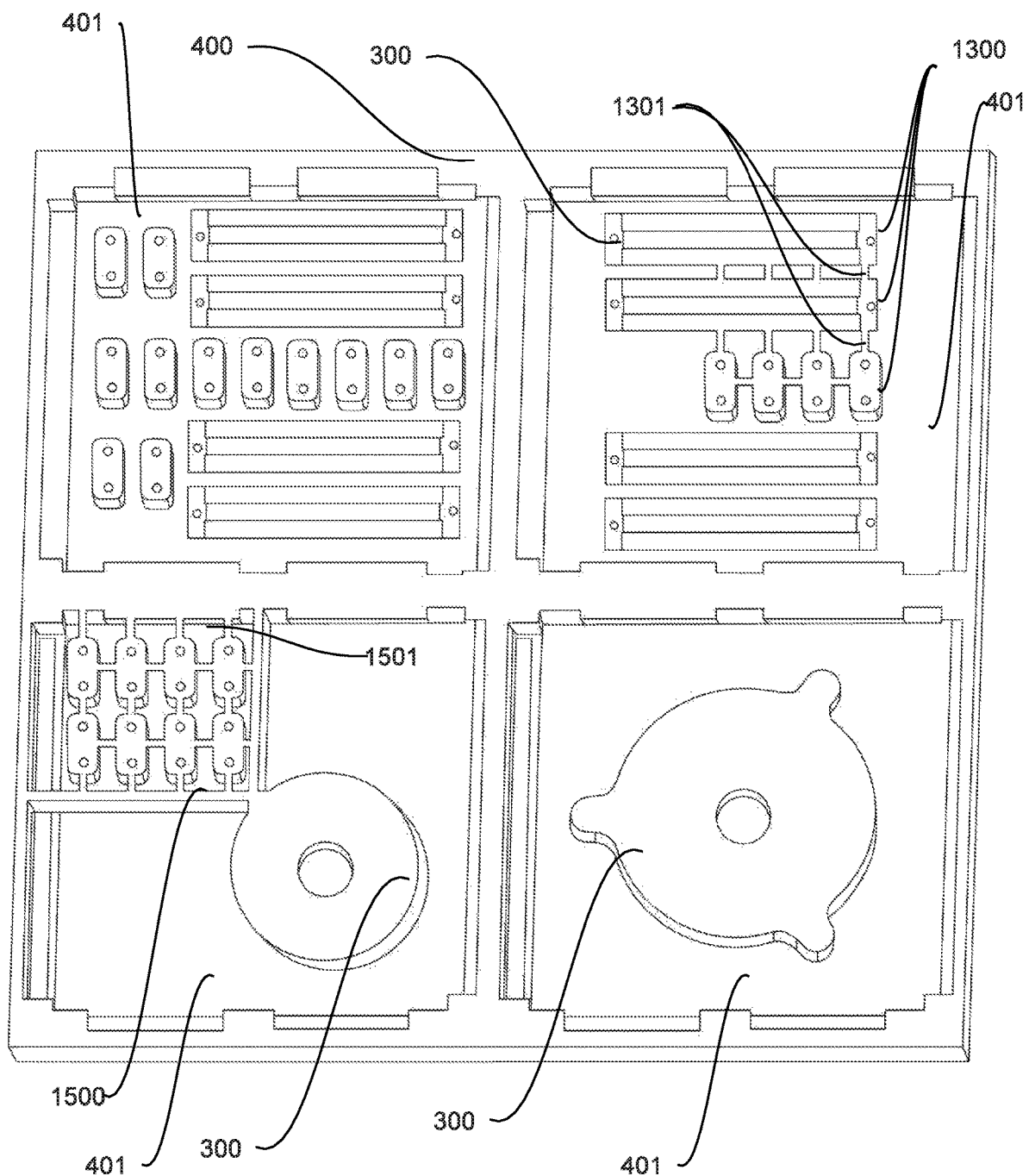
FIG. 15 is a perspective view illustrating an exemplary embodiment of a frame having multiple openings, with embodiments of additively manufactured bodies of material inserted in the openings.

FIG. 14 illustrates an exemplary embodiment of an additively manufactured body of material 300 including a plurality of interconnected structures 1300 that is inserted in at least an opening 401 of an embodiment of frame 400. As before, in this illustration, frame 400 has a single opening that is substantially rectangular. FIG. 15 illustrates an example of alternative embodiment of frame in which at least an opening 401 includes multiple openings. In this example, additively manufactured body of material 300 including a plurality of interconnected structures 1300 is placed in one of the plurality of openings 401. In another of plurality of openings 401 is another embodiment of an additively manufactured body of material 300 to be made into a discrete object, for instance according to method 100. Other openings of at least an opening may include a subframe 1500, defined as a frame built within an opening of frame 400; subframe 1500 may be manufactured according to any method useable for manufacturing frame 400, including subtractive or additive manufacturing methods. In this illustration, subframe 1500 is connected to another embodiment of body of material 300; subframe 1500 may have been formed and connected to body of material 300 using additive manufacturing. Subframe 1500 may include a subframe opening 1501, which may in turn contain other structures or bodies of material to be subjected to subtractive manufacturing. Subframe opening 1501 may have additional subframes within subframe opening, which may in turn have subframes within their openings; fundamentally, there is no limit to the number or complexity of nested subframes that may be used.

Figure 16:
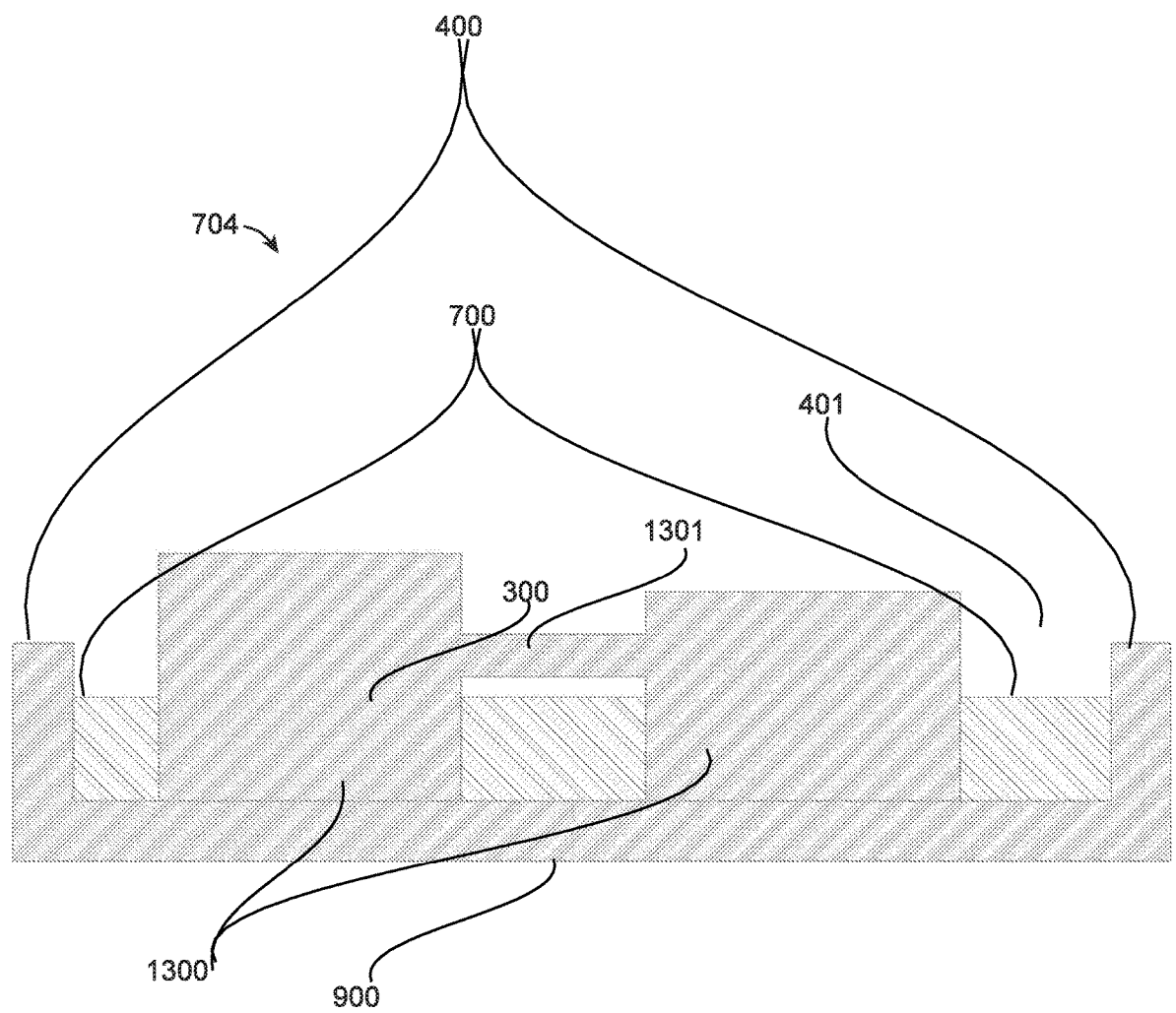
FIG. 16 is a cross-sectional view illustrating an exemplary additively manufactured body of material inserted in the opening of a frame with removable fixating material added.

Turning now to FIG. 16, a cross-sectional view is shown of an exemplary embodiment of frame 400 with an integral base 800. An embodiment of additively manufactured body 300 including a plurality of interconnected structures 1300 is shown; additively manufactured body 1300 may include a connective portion 1301 connecting the interconnected structures 1300. Additively manufactured body 300 may be placed in frame, and removable fixating material 700 may be installed, forming a stabilized workpiece 704; In an embodiment, connective portions 1301 are insufficiently strong to stabilize stabilized workpiece 704 for subtractive manufacturing operations without removable fixating material 700. As in method 100, an embodiment of frame 400 with removable base or tray may be used instead of frame 400 with integral base 800.

Figure 17:
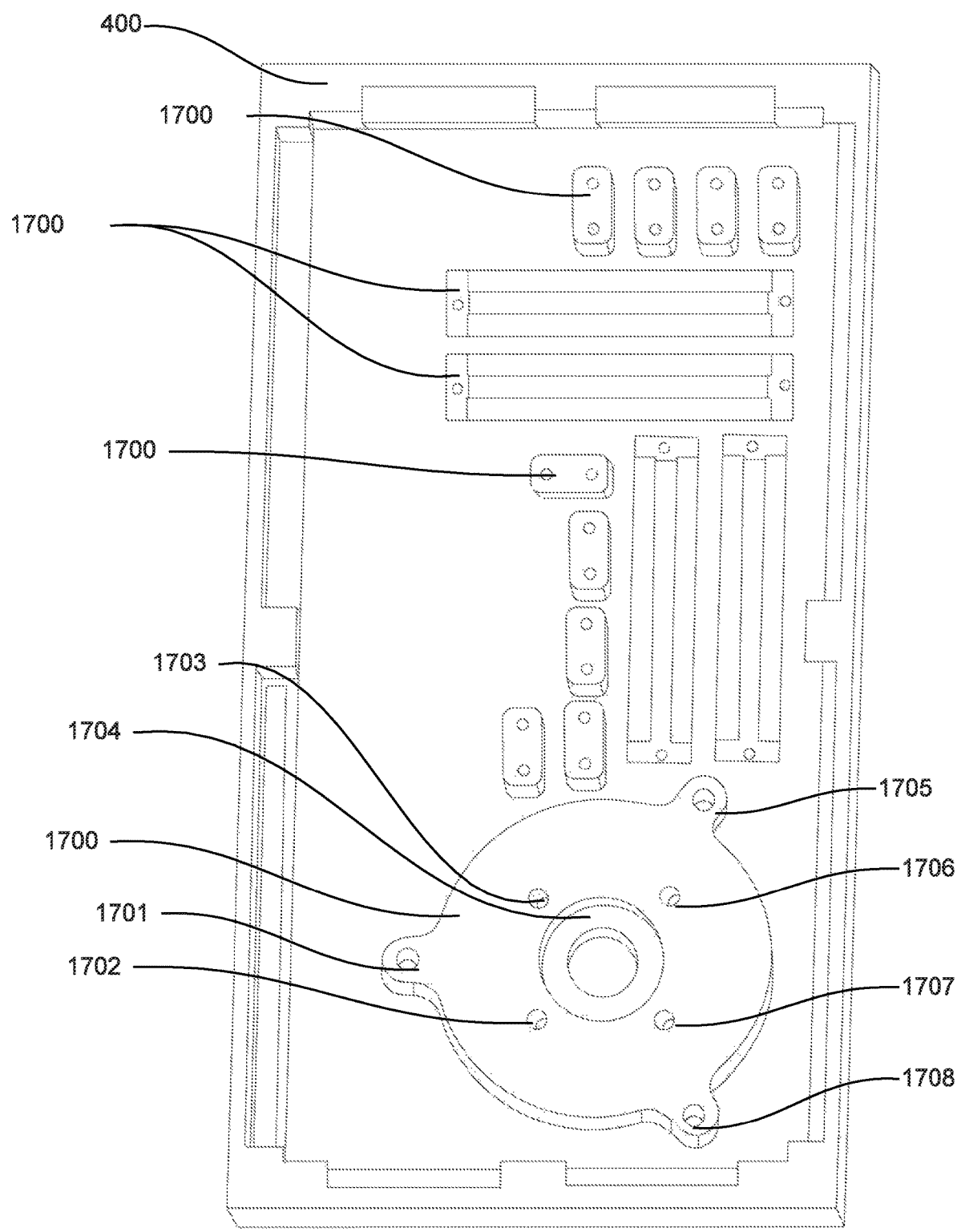
FIG. 17 is a perspective view showing a plurality of discrete objects in a frame after removing the removable fixating material from the stabilized workpiece.

FIG. 17 shows an exemplary embodiment with plurality of discrete objects 1700 in frame 400 after subtractive manufacturing has taken place and removable fixating material has been removed. In an embodiment, interconnecting portions are removed by subtractive manufacturing; In an embodiment not shown, interconnecting portions are left in place during subtractive manufacturing, and removed afterward using another process, such as cutting with manual cutters, a band saw, or another cutting implement. As in method 100, each of plurality of discrete objects 1700 may have features 1701-1708 formed by subtractive manufacturing that were absent from additively manufactured body of material, such as one or more holes, which may be through-holes or blind holes or holes that have been formed that subsequently were tapped to produce threads. Discrete objects 1300 may have modified features that were present in additively manufactured body of material 300; for instance, surfaces of discrete objects may have been subtractively manufactured flat or machined to allow a tolerance fit, for instance a press-fit for a bearing.

Figure 18:
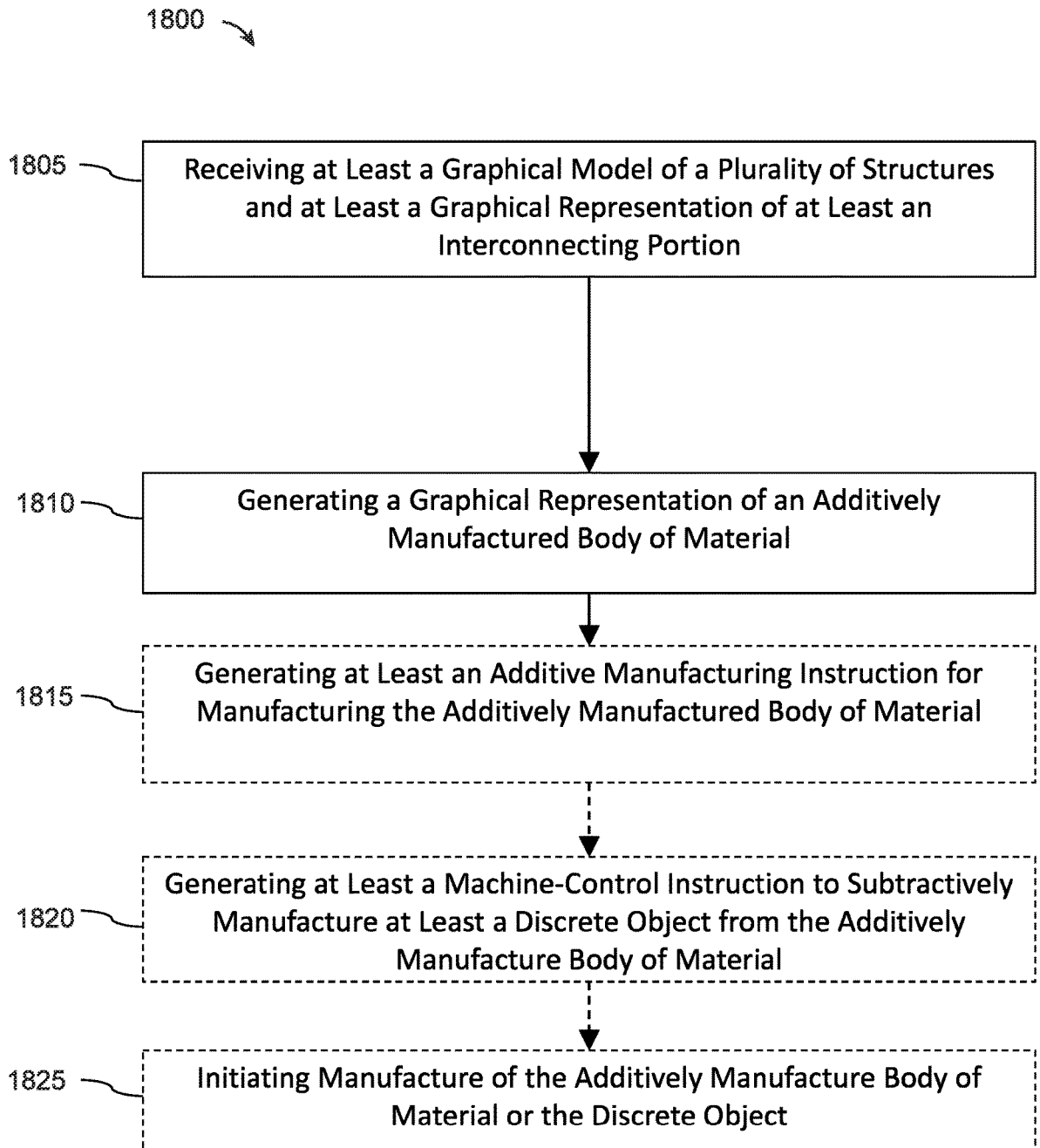
FIG. 18 is a flow diagram illustrating an exemplary method of manufacturing a plurality of discrete objects from an additively manufactured body of material in accordance with the present invention.

Referring now to FIG. 18, an exemplary method 1800 for manufacturing a plurality of discrete objects from a body of material created by additive manufacturing is illustrated. At step 1805, a controller 224 receives at least a graphical model of a plurality of structures and at least a graphical representation of at least an interconnecting portion. In an embodiment, this may be implemented as disclosed above in reference to FIGS. 1-17 and in materials incorporated by reference. At least an interconnecting portion may connect at least a first structure of the plurality of structures to at least a second structure of the plurality of structures; for instance, at least an interconnecting portion may connect two or more structures of the plurality of structures according to any means or method described above in reference to FIGS. 1-17. Receiving at least an interconnecting portion may include generating the interconnecting portion as a function of the at least a graphical model of a plurality of structures, for instance as disclosed above in reference to FIGS. 1-17. In an embodiment, controller 224 may receive at least a graphical representation of a frame having at least an opening, which may be any graphical representation of any frame as described above in reference to FIGS. 1-17. Controller 224 may locate at least a graphical model of a plurality of structures in the at least an opening; this may be performed according to any means or method described above in reference to FIGS. 1-17. Methods for locating at least a graphical model of a plurality of structures in the at least a frame opening may further be performed according to U.S. Non-Provisional application Ser. No. 15/871,191, filed on Jan. 15, 2018, the entirety of which is incorporated herein by reference, and/or in U.S. Non-Provisional application Ser. No. 15/857,312, filed on Dec. 28, 2017, the entirety of which is incorporated herein by reference. In an embodiment, at least a graphical model of the plurality of structures further comprises at least a graphical representation of a portion of the frame, for instance and without limitation as described above in reference to FIGS. 1-17.

Still referring to FIG. 18, and at step 1810, controller 224 generates a graphical representation of an additively manufactured body of material, as a function of the graphical model of the plurality of structures, and the graphical representation of the at least an interconnecting portion. This may be performed, as a non-limiting example, as described above in references to FIGS. 1-17 and/or as described in the '419 application as incorporated above. Graphical representation of additively manufactured body of material may incorporate any feature described above for graphical representation of additively manufacture body of material, including without limitation frame and/or section or portion of frame, as described above; for instance, where frame or section of frame is a part of additively manufactured body of material, or where additively manufactured body of material is to be additively manufactured within frame as described above, frame may be included in graphical representation of additively manufactured body of material.

At optional step 1815, and still viewing FIG. 18, controller 224 generates at least an additive manufacturing instruction for manufacturing the additively manufactured body of material, as a function of the graphical representation of the additively manufactured body of material. This may be performed as described above in reference to FIGS. 1-17, and/or as described in the '419 application as incorporated above. Where additively manufacture body of material includes a portion of a frame as described above in reference to FIGS. 1-17, generating the at least an additive manufacturing instruction may include, without limitation, generating at least an additive manufacturing instruction for manufacturing a portion of the frame, as a function of the at least a graphical representation of a portion of the frame.

At step 1820, and still viewing FIG. 18, controller may generate at least a machine-control instruction to subtractively manufacture at least a discrete object from the additively manufactured body of material. This may be performed as described above in reference to FIGS. 1-17, and/or as described in any material incorporated herein by reference. Generating the at least a machine-control instruction may include receiving a graphical representation of the at least a discrete object and generating the at least a machine-control instruction as a function of the graphical representation of the at least a discrete object, for example and without limitation as described above in reference to FIGS. 1-17 and/or in any material incorporated herein by reference. At optional step 1825, and still referring to FIG. 18, controller 224 may initiate manufacture of the additive body of material and/or discrete object. This may be performed as described above in reference to FIGS. 1-17, and/or as described in any material incorporated herein by reference. Initiation of manufacture may include performance of a first step in the removal of material from additively manufactured body of material and/or addition of material to additively manufactured body of material as described above; first step may include a particular milling or cutting operation, such as the performance of a registration cut. First step may include location of body of material at an automated manufacturing device; location may include placement in a precise position and/or registration within a coordinate system used by automated manufacturing device to guide particular manufacturing steps. First step may include generation of a control instruction initiating manufacturing steps; generation of a control instruction may include transmission of a signal to initiate manufacture and/or transmission of any machine control instruction sets generated as described above, including without limitation transmission of information for localized and machine-specific machine-control instruction generation. Transmission may be direct or indirect; for instance, transmission may involve transmission to a remote device that relays transmission to an automated manufacturing device or computing device coupled thereto, or transmission to an auxiliary computing device or computer memory for transport to the automated manufacturing device and/or computing device coupled thereto. Initiation of manufacture may include initiating additive manufacture of the additively manufactured body of material as a function of the graphical representation of the additively manufactured body of material. Initiating manufacture may include initiating subtractive manufacture of at least a discrete object from the additively manufactured body of material; this may be performed as a function of graphical representation of additively manufacture body of material, a graphical representation of one or more discrete objects, or both.

Although in the foregoing illustrative description the manufacturing process performed on additively manufactured body of material 300 is a subtractive manufacturing process, In an embodiment some non-subtractive manufacturing steps are also performed on additively manufactured body of material; such steps may include without limitation any additive manufacturing step described above. In an embodiment, additive and subtractive manufacturing steps are each performed on additively manufactured body of material 300.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 19:
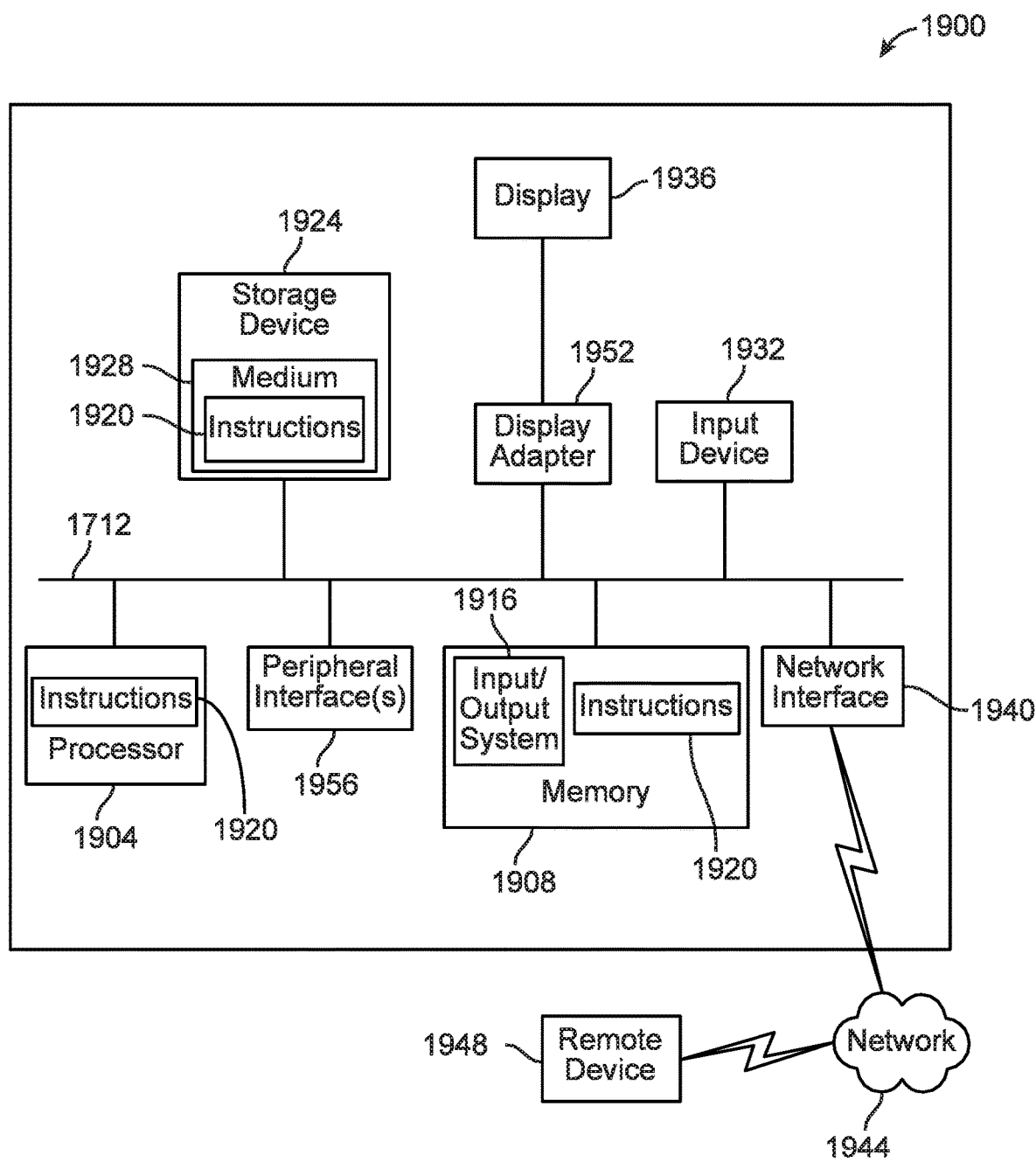
FIG. 19 is a diagrammatic representation of one embodiment of a computing device in the exemplary form.

FIG. 19 shows a diagrammatic representation of one embodiment of a computing device in the exemplary form of a computer system 1900 within which a set of instructions, such as certain steps of FIG. 1, for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1900 includes a processor 1904 and a memory 1908 that communicate with each other, and with other components, via a bus 1912. Bus 1912 may include any of several types of bus structures including, but not limited to, a memory bus, a memory controller, a peripheral bus, a local bus, and any combinations thereof, using any of a variety of bus architectures.

Memory 1908 may include various components (e.g., machine-readable media) including, but not limited to, a random access memory component, a read only component, and any combinations thereof. In one example, a basic input/output system 1916 (BIOS), including basic routines that help to transfer information between elements within computer system 1900, such as during start-up, may be stored in memory 1908. Memory 1908 may also include (e.g., stored on one or more machine-readable media) instructions (e.g., software) 1920 embodying any one or more of the aspects and/or methodologies of the present disclosure. In another example, memory 1908 may further include any number of program modules including, but not limited to, an operating system, one or more application programs, other program modules, program data, and any combinations thereof.

Computer system 1900 may also include a storage device 1924. Examples of a storage device (e.g., storage device 1924) include, but are not limited to, a hard disk drive, a magnetic disk drive, an optical disc drive in combination with an optical medium, a solid-state memory device, and any combinations thereof. Storage device 1924 may be connected to bus 1912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1924 (or one or more components thereof) may be removably interfaced with computer system 1900 (e.g., via an external port connector (not shown)). Particularly, storage device 1924 and an associated machine-readable medium 1928 may provide nonvolatile and/or volatile storage of machine-readable instructions, data structures, program modules, and/or other data for computer system 1900. In one example, software 1920 may reside, completely or partially, within machine-readable medium 1928. In another example, software 1920 may reside, completely or partially, within processor 1904.

Computer system 1900 may also include an input device 1932. In one example, a user of computer system 1900 may enter commands and/or other information into computer system 1900 via input device 1932. Examples of an input device 1932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1932 may be interfaced to bus 1912 via any of a variety of interfaces (not shown) including, but not limited to, a serial interface, a parallel interface, a game port, a USB interface, a FIREWIRE interface, a direct interface to bus 1912, and any combinations thereof. Input device 1932 may include a touch screen interface that may be apart of or separate from display 1936, discussed further below. Input device 1932 may be utilized as a user selection device for selecting one or more graphical representations in a graphical interface as described above.

A user may also input commands and/or other information to computer system 1900 via storage device 1924 (e.g., a removable disk drive, a flash drive, etc.) and/or network interface device 1940. A network interface device, such as network interface device 1940, may be utilized for connecting computer system 1900 to one or more of a variety of networks, such as network 1944, and one or more remote devices 1948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1944, may employ a wired and/or a wireless mode of communication. In general, any network topology may be used. Information (e.g., data, software 1920, etc.) may be communicated to and/or from computer system 1900 via network interface device 1940.

Computer system 1900 may further include a video display adapter 1952 for communicating a displayable image to a display device, such as display device 1936. Examples of a display device include, but are not limited to, a liquid crystal display (LCD), a cathode ray tube (CRT), a plasma display, a light emitting diode (LED) display, and any combinations thereof. Display adapter 1952 and display device 1936 may be utilized in combination with processor 1904 to provide graphical representations of aspects of the present disclosure. In addition to a display device, computer system 1900 may include one or more other peripheral output devices including, but not limited to, an audio speaker, a printer, and any combinations thereof. Such peripheral output devices may be connected to bus 1912 via a peripheral interface 1956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for manufacturing a plurality of discrete objects from a body of material created by additive manufacturing using an automated manufacturing device, the system comprising:
    an automated manufacturing device, the automated manufacturing device comprising at least a controller;
    wherein the controller is configured to:
        receive at least a graphical model of a plurality of structures;
        receive at least a graphical representation of at least an interconnecting portion, the at least an interconnecting portion connecting at least a first structure of the plurality of structures to at least a second structure of the plurality of structures; and
        generate, by the at least a controller, a graphical representation of an additively manufacture body of material as a function of the graphical model of the plurality of structures and the graphical representation of the at least an interconnecting portion, wherein said graphical representation of an additively manufacture body of material includes a graphical model of a frame; and
        generate, by the at least a controller, at least an additive manufacturing instruction for manufacturing the additively manufactured body of material as a function of the graphical representation of an additively manufacture body of material.

2. The system of claim 1, wherein the automated manufacturing device further comprises at least a manufacturing tool.

3. The system of claim 2, wherein the at least a manufacturing tool further comprises an additive manufacturing tool.

4. The system of claim 3, wherein the controller is further configured to manufacture the additively manufactured body of material using the additive manufacturing tool.

5. The system of claim 2, wherein the at least a manufacturing tool further comprises a subtractive manufacturing tool.

6. The system of claim 5, wherein the controller is further configured to subtractively manufacture a plurality of discrete objects from the additively manufacture body of material.

7. The system of claim 5, wherein the controller is further configured to generating at least a machine-control instruction to subtractively manufacture at least a discrete object from the additively manufactured body of material.

8. The system of claim 7, wherein the controller is further configured to receive a graphical representation of the at least a discrete object; and generate the at least a machine-control instruction as a function of the graphical representation of the at least a discrete object.

9. The system of claim 1, the system further comprising:
    an automated subtractive manufacturing device, wherein the automated subtractive manufacturing device is configured to:
        receive an additively manufactured body of material including a plurality of interconnected structures;
        receive a frame having at least an opening;
        place the additively manufactured body of material within the opening of the frame;
        install removable fixating material around the additively manufactured body of material and within the opening of the frame, so that the removable fixing material and the additively manufactured body of material form a stabilized workpiece;
        form, by subtractive manufacturing, the plurality of discrete objects from the body of material; and
        remove the removable fixating material.

10. A method of manufacturing a plurality of discrete objects from a body of material created by additive manufacturing, the method comprising:
    receiving, at an automated manufacturing device, at least a graphical model of a plurality of structures and at least a graphical representation of at least an interconnecting portion, wherein the at least an interconnecting portion connects at least a first structure of the plurality of structures to at least a second structure of the plurality of structures; and
    generating, at a controller operating on the automated manufacturing device, a graphical representation of an additively manufacture body of material, as a function of the graphical model of the plurality of structures, and the graphical representation of the at least an interconnecting portion, wherein the graphical representation of an additively manufacture body of material includes a graphical model of a frame; and
    generating, at the controller operating on the automated manufacturing device, at least an additive manufacturing instruction for manufacturing the additively manufactured body of material as a function of the graphical representation of an additively manufacture body of material.

11. The method of claim 10 further comprising initiating manufacture of the additively manufactured body of material as a function of the graphical representation of the additively manufactured body of material.

12. The method of claim 10, wherein receiving the at least an interconnecting portion further comprises generating the interconnecting portion as a function of the at least a graphical model of a plurality of structures.

13. The method of claim 12 further comprising:
    receiving at least a graphical representation of a frame having at least an opening; and
    locating at least a graphical model of a plurality of structures in the at least an opening.

14. The method of claim 13, wherein the at least a graphical model of the plurality of structures further comprises at least a graphical representation of a portion of the frame.

15. The method of claim 14 further comprising generating at least an additive manufacturing instruction for manufacturing the portion of the frame, as a function of the at least a graphical representation of a portion of the frame.

16. The method of claim 12, wherein generating the at least a machine-control instruction further comprises:

receiving a graphical representation of the at least a discrete object; and generating the at least a machine-control instruction as a function of the graphical representation of the at least a discrete object.

17. The method of claim 10, further comprising generating at least a machine-control instruction to subtractively manufacture at least a discrete object from the additively manufactured body of material.

18. The method of claim 10, further comprising initiating subtractive manufacture of at least a discrete object from the additively manufactured body of material.

* * * * *